US 10,947,381 B2

(12) United States Patent
Van Der Mee et al.

(10) Patent No.: US 10,947,381 B2
(45) Date of Patent: *Mar. 16, 2021

(54) HIGH HEAT COPOLYCARBONATE COMPOSITIONS HAVING ENHANCED OPTICAL PROPERTIES, ARTICLES FORMED THEREFROM, AND METHODS OF MANUFACTURE

(71) Applicant: SABIC GLOBAL TECHNOLOGIES B.V., Bergen op Zoom (NL)

(72) Inventors: Mark Adrianus Johannes Van Der Mee, Breda (NL); Nathalie Gonzalez Vidal, Bergen op Zoom (NL); Fabrizio Micciche, Breda (NL); Roland Sebastian Assink, Middelburg (NL); Kazuhiko Mitsui, Moka (JP); Johannes De Brouwer, Oisterwijk (NL); Shahram Shafaei, Bergen op Zoom (NL); Hendrikus Petrus Cornelis Van Heerbeek, Bergen op Zoom (NL); Tamara Marijke Eggenhuisen, Breda (NL); Robert Dirk Van De Grampel, Tholen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 9 days.

This patent is subject to a terminal disclaimer.

(21) Appl. No.: 16/302,827

(22) PCT Filed: May 27, 2017

(86) PCT No.: PCT/IB2017/053139
§ 371 (c)(1),
(2) Date: Nov. 19, 2018

(87) PCT Pub. No.: WO2017/203496
PCT Pub. Date: Nov. 30, 2017

(65) Prior Publication Data
US 2019/0300701 A1 Oct. 3, 2019

Related U.S. Application Data

(60) Provisional application No. 62/342,422, filed on May 27, 2016.

(51) Int. Cl.
*C08L 69/00* (2006.01)
*C08G 64/06* (2006.01)
(Continued)

(52) U.S. Cl.
CPC .............. *C08L 69/00* (2013.01); *C08G 64/06* (2013.01); *C08G 64/12* (2013.01); *C08J 7/04* (2013.01);
(Continued)

(58) Field of Classification Search
None
See application file for complete search history.

(56) References Cited

U.S. PATENT DOCUMENTS

| 5,344,910 A | 9/1994 | Sybert |
| 5,475,152 A | 12/1995 | Kissinger et al. |

(Continued)

FOREIGN PATENT DOCUMENTS

| EP | 0788839 B1 | 5/2003 |
| EP | 1808726 A1 | 7/2007 |

(Continued)

OTHER PUBLICATIONS

Machine Translation of Japanese Office Action dated Jul. 5, 2019 for JP 2018-561968, 5 pages.

(Continued)

*Primary Examiner* — Robert T Butcher
(74) *Attorney, Agent, or Firm* — Cantor Colburn LLP

(57) ABSTRACT

A thermoplastic composition comprises: a copolycarbonate comprising bisphenol A carbonate units and second carbonate units of the formula (I) and optionally, a bisphenol A homopolycarbonate; wherein the second carbonate units are present in an amount of 10 to 49 mol % based on the sum of the moles of the copolycarbonate and the bisphenol A homopolycarbonate, the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, and the thermoplastic composition has a bisphenol A purity of at least 99.6%, or at least 99.7% as determined by high performance liquid chromatography. The thermoplastic composition has a Vicat B120 of 155° C. or higher; and an increase in yellowness index of less than 10 during 1000 hours of heat aging at 155° C.

20 Claims, No Drawings (I)

(51) Int. Cl.
*G02B 1/04* (2006.01)
*C08G 64/12* (2006.01)
*C08J 7/04* (2020.01)

(52) U.S. Cl.
CPC .............. *G02B 1/04* (2013.01); *G02B 1/041* (2013.01); *C08J 2369/00* (2013.01); *C08J 2469/00* (2013.01); *C08L 2201/08* (2013.01); *C08L 2201/10* (2013.01); *C08L 2205/02* (2013.01); *C08L 2205/025* (2013.01); *C08L 2205/03* (2013.01)

(56) References Cited

U.S. PATENT DOCUMENTS

| | | | |
|---|---|---|---|
| 5,475,154 | A | 12/1995 | Lundquist et al. |
| 5,502,153 | A | 3/1996 | Sakashita et al. |
| 7,112,703 | B2 | 9/2006 | Neumann et al. |
| 7,642,315 | B2 | 1/2010 | Davis et al. |
| 9,062,196 | B2 | 6/2015 | Chatterjee et al. |
| 9,287,471 | B2 | 3/2016 | De Brouwer et al. |
| 9,290,618 | B2 | 3/2016 | De Brouwer et al. |
| 9,299,898 | B2 | 3/2016 | De Brouwer et al. |
| 9,546,269 | B2 | 1/2017 | Vollenberg et al. |
| 9,732,185 | B2 | 8/2017 | Takimoto et al. |
| 9,771,452 | B2 | 9/2017 | De Brouwer et al. |
| 2003/0232957 | A1 | 12/2003 | Silvi et al. |
| 2004/0077820 | A1 | 4/2004 | Silva et al. |
| 2005/0070615 | A1 | 3/2005 | Terajima et al. |
| 2005/0209434 | A1 | 9/2005 | Abad et al. |
| 2005/0288407 | A1 | 12/2005 | Heuer et al. |
| 2006/0069292 | A1 | 3/2006 | Kumar et al. |
| 2007/0004941 | A1 | 1/2007 | Blaschke et al. |
| 2007/0010619 | A1 | 1/2007 | Chatterjee et al. |
| 2007/0100021 | A1 | 5/2007 | Glasgow et al. |
| 2007/0123686 | A1 | 5/2007 | Mahood et al. |
| 2007/0135612 | A1* | 6/2007 | Ganesan ............... C08G 64/12 528/196 |
| 2008/0058497 | A1 | 3/2008 | Ganesan et al. |
| 2009/0088504 | A1 | 4/2009 | Chatterjee et al. |
| 2011/0071261 | A1 | 3/2011 | Hoeks et al. |
| 2011/0151262 | A1 | 6/2011 | Heuer et al. |
| 2012/0157653 | A1 | 6/2012 | Konig et al. |
| 2013/0108820 | A1 | 5/2013 | Belfadhel et al. |
| 2013/0225763 | A1 | 8/2013 | Pai-Paranjape et al. |
| 2013/0270591 | A1 | 10/2013 | De Brouwer et al. |
| 2014/0051802 | A1* | 2/2014 | De Brouwer ......... C08G 64/06 524/611 |
| 2014/0051803 | A1 | 2/2014 | De Brouwer et al. |
| 2016/0222191 | A1 | 8/2016 | Sharifi |
| 2016/0237210 | A1 | 8/2016 | Mahood et al. |
| 2019/0169368 | A1 | 6/2019 | Van Der Mee et al. |
| 2019/0203043 | A1 | 7/2019 | Van Der Mee et al. |
| 2019/0218391 | A1 | 7/2019 | Van Der Mee et al. |
| 2019/0276665 | A1 | 9/2019 | Van Der Mee et al. |

FOREIGN PATENT DOCUMENTS

| | | |
|---|---|---|
| GB | 1377227 A | 12/1974 |
| JP | 09040854 A | 2/1997 |
| JP | 2000191899 A1 | 7/2000 |
| WO | 2007136934 A1 | 11/2007 |
| WO | 2009045791 A1 | 4/2009 |
| WO | 2012150559 A1 | 11/2012 |
| WO | 2012150560 A1 | 11/2012 |
| WO | 2013061274 A1 | 5/2013 |
| WO | 2013175448 A1 | 11/2013 |
| WO | 2014031730 A1 | 2/2014 |
| WO | 2014072923 A1 | 5/2014 |

OTHER PUBLICATIONS

Anderson et al.; "Quantitative Analysis of Commercial Bisphenol A by Paper Chromatography"; Analytical Chemistry; vol. 31, No. 7; 1959; p. 1214-1217.
Anonymous, "Polycarbonate preparation with a low yellowness index," Research Disclosure, Mason Publications, Hampshire GB vol. 449, No. 49 (Sep. 1, 2001) ISSN: 0374-4353 pp. 1-3.
Brunelle, D.J.: "Polycarbonates", Encyclopedia of Polymer Science and Technology, Jan. 1, 2006, pp. I.1-I.33, XP002525090, DOI: 10.1002/0471440264PST255.PUB2, Retrieved from the Internet: URL: http://mrw.interscience.wiley.com/emrw/9780471440260/epst/article/p.
Brydia; "Determination of Bisphenol A and Impurities by Gas Chromatography of Their Trimethylsilyl Ether Derivatives" Analytical Chemistry; vol. 40, No. 14; 1968; pp. 2212-2215.
De Brouwer et al.; "Lexan* Polycarbonate for Optical Applications"; Sabic Innovative Plastics; 5 Pages.
Factor; "Search for the Sources of Color in Thermally Aged, Weathered and y-Ray Irradiated Bisphenol A Polycarbonate"; Die Angewandte Makromolekulare Chemie; vol. 232; 1995; pp. 27-43.
Godinez et al.; "Experimental Study of the Influence of Raw Material Impurities on Yellowness Index of Transesterification Polycarbonate"; Journal of Applied Polymer Science; vol. 119; 2011; pp. 1348-1356.
International Search Report for International Application No. PCT/IB2017/053139, International Filing Date May 27, 2017, dated Sep. 7, 2017, 6 pages.
Nowakowska et al.; "Studies of Some Impurities in Commercial Bisphenol-A"; Polish Journal of Applied Chemistry; vol. XL, No. 3; 1996; pp. 247-254.
Poskrobko et al.; "High-Performance Liquid Chromatography with Multi-Wavelength Detection of the Bisphenol A Impurities"; Journal of Chromatography A; vol. 883; 2000; pp. 291-297.
Sullivan et al.; "The Effects of Inorganic Solid Particles on Water and Crude Oil Emulsion Stability"; Ind. Eng. Chem. Res.; 2002; vol. 41; pp. 3389-3404.
Tadros; "Emulsion Formation, Stability, and Rheology"; first edition; 2013; 76 pages.
Underwriter's Laboratory Bulletin 94, "Tests for Flammability of Plastic Materials for Parts in Devices and Appliances" (ISBN 0-7629-0082-2), Fifth Edition, Dated Oct. 29, 1996, incorporating revisions through and including Dec. 12, 2003; 52 pages.
Written Opinion for International Application No. PCT/IB2017/053139, International Filing Date May 27, 2017, dated Sep. 7, 2017, 7 pages.

* cited by examiner

HIGH HEAT COPOLYCARBONATE COMPOSITIONS HAVING ENHANCED OPTICAL PROPERTIES, ARTICLES FORMED THEREFROM, AND METHODS OF MANUFACTURE

CROSS REFERENCE TO RELATED APPLICATIONS

This application is a National Stage application of PCT/IB2017/053139, filed May 27, 2017, which claims the benefit of U.S. Provisional Application No. 62/342,422, filed May 27, 2016, both of which are incorporated by reference in their entirety herein.

BACKGROUND

This disclosure generally relates to polycarbonate compositions, and more particularly, to high heat copolycarbonate compositions having enhanced optical properties, methods of manufacture, and uses thereof.

Polycarbonates are useful in the manufacture of articles and components for a wide range of applications, from automotive parts to electronic devices. Because of their broad use, particularly in lenses, optical films, and healthcare products requiring high heat sterilization, it is desirable to provide polycarbonates with high heat performance combined with good optical properties, particularly after processing and after exposure to real life conditions such as prolonged exposure to high temperatures.

Some known "high heat" copolycarbonates can have high glass transition temperatures of 150° C. or higher. But such polycarbonates are typically more yellow after processing and have lower transmission values. There accordingly remains a need for polycarbonate compositions having improved balance of high heat performance and optical properties.

SUMMARY

In an embodiment, a thermoplastic composition comprises: a copolycarbonate comprising bisphenol A carbonate units and second carbonate units of the formula

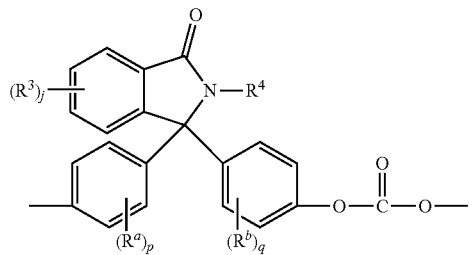

wherein $R^a$ and $R^b$ are each independently a $C_{1-12}$ alkyl, $C_{1-12}$ alkenyl, $C_{3-8}$ cycloalkyl, or $C_{1-12}$ alkoxy, each $R^3$ is independently a $C_{1-6}$ alkyl, $R^4$ is hydrogen, $C_{2-6}$ alkyl or phenyl optionally substituted with 1 to 5 $C_{1-6}$ alkyl groups, p, q, and j are each independently 0 to 4; and optionally, a bisphenol A homopolycarbonate; wherein the second carbonate units are present in an amount of 10 to 49 mol %, preferably 13 to 40 mol % or 35 to 49 mol %, more preferably 18 to 35 mol % based on the sum of the moles of the copolycarbonate and the bisphenol A homopolycarbonate, the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, and the thermoplastic composition has a bisphenol A purity of at least 99.6%, or at least 99.7% as determined by high performance liquid chromatography; and wherein the thermoplastic composition has: a Vicat B120 of 155° C. or higher, preferably 165° C. or higher, more preferably 180° C. or higher as measured according to ISO 306; and an increase in yellowness index of less than 10, or of less than 7 during 1000 hours of heat aging at 155° C., as measured by ASTM D1925 on a 1 mm thick molded plaque.

In another embodiment, a thermoplastic composition comprising: a copolycarbonate comprising bisphenol A carbonate units and second carbonate units of the formula

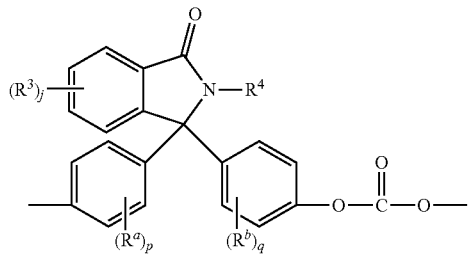

wherein $R^a$ and $R^b$ are each independently a $C_{1-12}$ alkyl, $C_{1-12}$ alkenyl, $C_{3-8}$ cycloalkyl, or $C_{1-12}$ alkoxy, each $R^3$ is independently a $C_{1-6}$ alkyl, $R^4$ is hydrogen, $C_{2-6}$ alkyl or phenyl optionally substituted with 1 to 5 $C_{1-6}$ alkyl groups, p, q, and j are each independently 0 to 4; and optionally, a bisphenol A homopolycarbonate; wherein the second carbonate units are present in an amount of 10 to 49 mol %, preferably 13 to 40 mol % or 35 to 49 mol %, more preferably 18 to 35 mol % based on the sum of the moles of the copolycarbonate and the bisphenol A homopolycarbonate, the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, and the thermoplastic composition has a bisphenol A purity of at least 99.6%, or at least 99.7% as determined by high performance liquid chromatography; and wherein the thermoplastic composition has: a Vicat B120 of 155° C. or higher, preferably 165° C. or higher, more preferably 180° C. or higher as measured according to ISO 306; and a yellowness index which is at least 20% or at least 30% lower compared to the same composition having a Bisphenol A purity below 99.6% or below 99.5%, as measured by ASTM D1925 on a 2.5 mm thick molded plaque with a melt temperature of 355° C. and a residence time of 10 min.

In yet another embodiment, an article comprises the above-described thermoplastic composition. The article can be a molded article, a thermoformed article, an extruded layer, a layer of a multi-layer article, a substrate for a coated article, or a substrate for a metallized article.

In still another embodiment, a method of manufacture of an article comprises injection molding, injection-compression molding, heat-cool molding, extrusion, rotational molding, blow molding, or thermoforming the above-described thermoplastic composition into an article.

The above described and other features are exemplified by the following detailed description, examples, and claims.

DETAILED DESCRIPTION

Surprisingly, it has now been found that a thermoplastic composition comprising phthalimidine copolycarbonates such as N-phenylphenolphthaleinylbisphenol, 2,2-bis(4-hydro)-bisphenol A copolycarbonate ("PPPBP-BPA") and optionally a bisphenol A homopolymer can achieve desirable high glass transition temperature and enhanced optical properties, when one or both of the phthalimidine copolycarbonate and the bisphenol A homopolycarbonate are derived from a high purity bisphenol A. In particular, the thermoplastic composition can not only have good initial color and transmission after molding under standard conditions but also lower color change after heat aging at elevated temperatures. Further, the thermoplastic composition can have improved color after molding at aggressive conditions.

As used herein, phthalimidine copolycarbonates are high heat copolycarbonates having a glass transition temperature of 155° C. or higher, and comprising bisphenol A carbonate units and second carbonate units of formula (1)

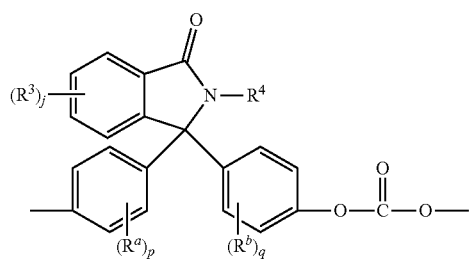

(1)

wherein $R_a$ and $R^b$ are each independently a $C_{1-12}$ alkyl, $C_{1-12}$ alkenyl, $C_{3-8}$ cycloalkyl, or $C_{1-12}$ alkoxy, preferably a $C_{1-3}$ alkyl, each $R^3$ is independently a $C_{1-6}$ alkyl, $R^4$ is hydrogen, $C_{1-6}$ or $C_{2-6}$ alkyl or phenyl optionally substituted with 1 to 5 $C_{1-6}$ alkyl groups, and p and q are each independently 0 to 4, preferably 0 to 1. For example, the second carbonate units can be of formula (1a)

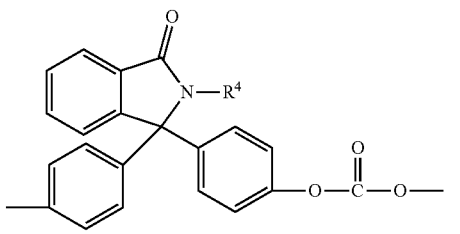

(1a)

wherein $R^5$ is hydrogen, phenyl optionally substituted with up to five $C_{1-6}$ alkyl groups, or $C_{1-4}$ alkyl, such as methyl or $C_{2-4}$ alkyl. In an embodiment, $R^5$ is hydrogen or phenyl, preferably phenyl. Carbonate units (1a) wherein $R^5$ is phenyl can be derived from 2-phenyl-3,3'-bis(4-hydroxy phenyl) phthalimidine (also known as 3,3-bis(4-hydroxyphenyl)-2-phenylisoindolin-1-one or N-phenyl phenolphthalein or "PPPBP").

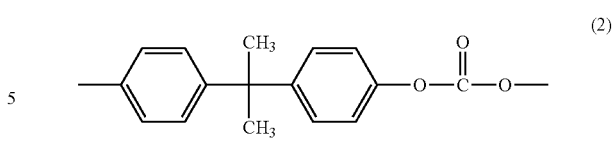

(2)

The optical properties of the thermoplastic composition can be further improved when the bisphenol A carbonate units in the high heat copolycarbonates, in the bisphenol A homopolymer or both, are derived from a bisphenol A monomer having a purity of greater than 99.70% as determined by high performance liquid chromatography (HPLC).

The copolycarbonate comprises from 50 to 90 mole percent (mol %) of the bisphenol A carbonate units and 10 to 50 mol % of the second carbonate units, preferably the copolycarbonate comprises from 60 to 85 mol % of the bisphenol A carbonate units and 15 to 40 mol % of the second carbonate units, and in an embodiment the copolycarbonate comprises from 50 to 70 mol % of the bisphenol A carbonate units and 30 to 50 mol % of the second carbonate units, each based on the total number of carbonate units in the copolycarbonate.

In some embodiments, the high heat copolycarbonates further include at least 5 mol % of third carbonate units different from bisphenol A carbonate units and second carbonate units based on the sum of the moles of the bisphenol A carbonate units, second carbonate units, and third carbonate units. The third carbonate units can have the formula

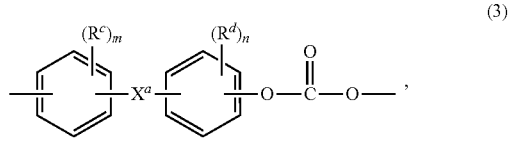

(3)

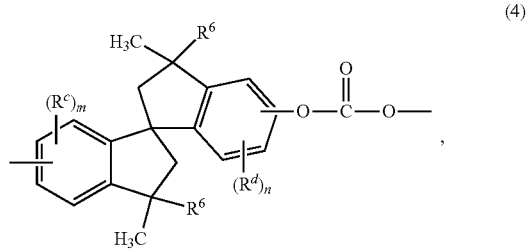

(4)

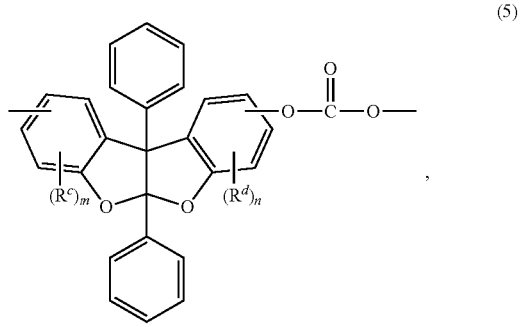

(5)

(6)
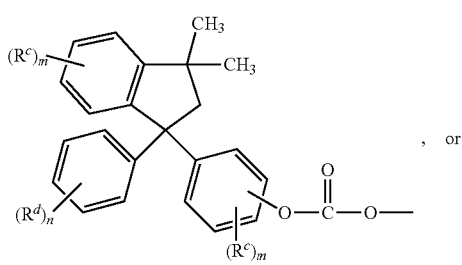
, or (7)
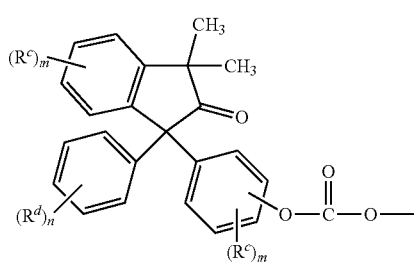

wherein $R^c$ and $R^d$ are each independently a $C_{1-12}$ alkyl, $C_{1-12}$ alkenyl, $C_{3-8}$ cycloalkyl, or $C_{1-12}$ alkoxy, each $R^6$ is independently $C_{1-3}$ alkyl or phenyl, preferably methyl, $X^a$ is a $C_{6-12}$ polycyclic aryl, $C_{3-18}$ mono- or polycycloalkylene, $C_{3-18}$ mono- or polycycloalkylidene, -$(Q^1)_x$-G-$(Q^2)_y$- group wherein $Q^1$ and $Q^2$ are each independently a $C_{1-3}$ alkylene, G is a $C_{3-10}$ cycloalkylene, x is 0 or 1, and y is 1, or —$C(P^1)(P^2)$— wherein $P^1$ is $C_{1-12}$ alkyl and $P^2$ is $C_{6-12}$ aryl; and m and n are each independently 0 to 4.

Exemplary third carbonate units include the following (3a)
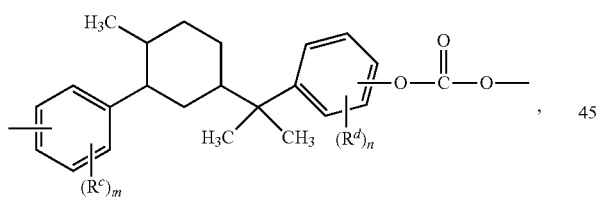

(3b)
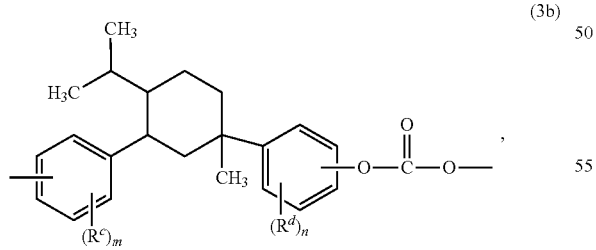

(3c)
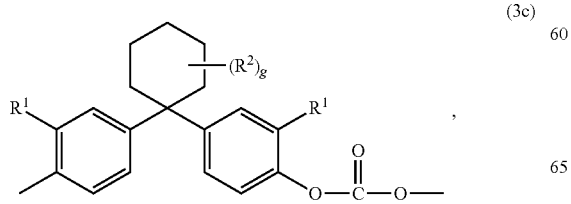

(3d)
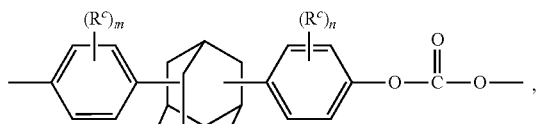

(3e)
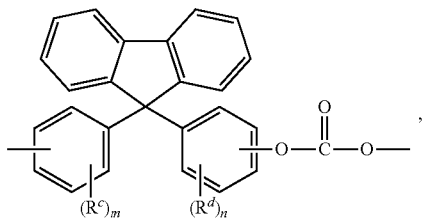

(3f)
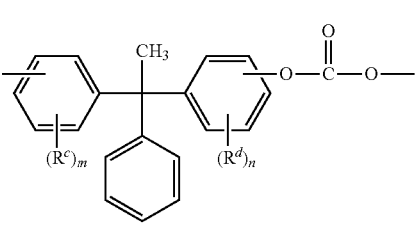

(3g)
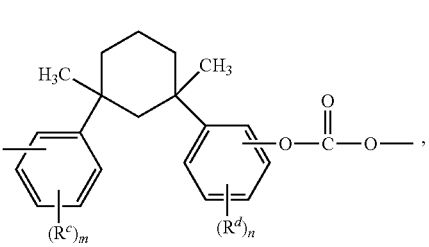

(3g)
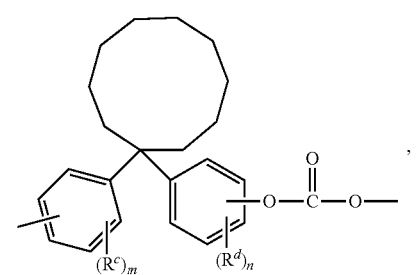

(3h)
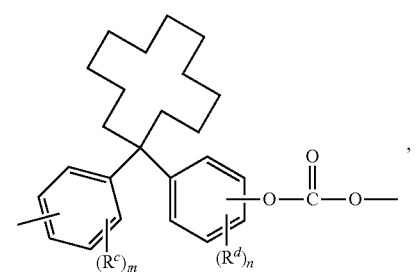

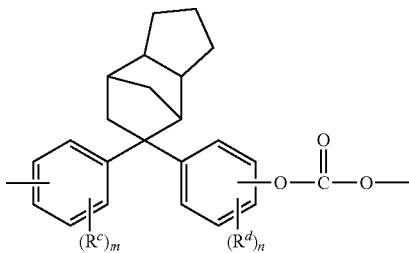

(3i)

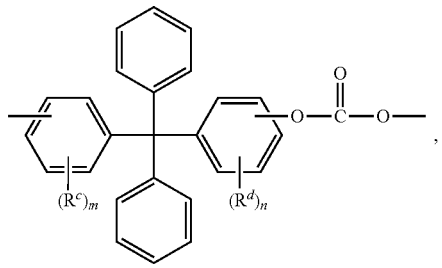

(3j)

or a combination thereof, wherein $R^c$ and $R^d$ are the same as defined herein for formulas (3) to (7), each $R^1$ is independently hydrogen or $C_{1-4}$ alkyl, each $R^2$ is independently $C_{1-4}$ alkyl, and g is 0 to 10. Preferably, each $R^1$ is independently hydrogen or methyl, each $R^2$ is independently methyl or hydrogen, g is 0 to 2, and m and n are 0. In a specific embodiment the third carbonate units are 1,1-bis(4-hydroxyphenyl)-3,3,5-trimethyl-cyclohexane carbonate units, 1,1-bis(4-hydroxy-3-methylphenyl)cyclohexane, or a combination thereof. Preferably, the third carbonate units are 1,1-bis (4-hydroxyphenyl)-3,3,5-trimethyl-cyclohexane (BPA TMC) carbonate units.

When the third carbonate units are present, the copolycarbonates can comprise 15 to 70 mol % of the bisphenol A carbonate units, 5 to 50 mol % of the second carbonate units, and 5 to 50 mol % of the third carbonate units, each based on the sum of moles of the bisphenol A carbonate units, second carbonate units, and third carbonate units. Preferably, the copolycarbonates comprise 30 to 60 mol % of the bisphenol A carbonate units, 5 to 35 mol % of the second carbonate units, 5 to 35 mol % of the third carbonate units, each based on the sum of the moles of the bisphenol A carbonate units, second carbonate units, and third carbonate units.

In an embodiment, the copolycarbonates are highly random copolymers, which have less than 15 mol % or less than 10 mol % of the second carbonate units directly coupled to another second carbonate unit based on the total number of carbonate units in the copolycarbonates. The molar percent can be determined by nuclear magnetic resonance spectroscopy (NMR). Without wishing to be bound by theory, it is believed that by keeping the randomness of the high heat polymer, the properties of the high heat polymer remains consistent from batch to batch.

To further enhance the optical properties of the thermoplastic compositions, the high heat copolycarbonates are essentially free of certain metal ions, anions, and preferably, low molecular weight molecules (those having a molecular weight of less than 150 Dalton) arising from manufacture of the copolymers. In an embodiment, the copolycarbonates comprise less than 2 ppm of each of triethyl amine, calcium ions, magnesium ions, potassium ions, iron ions, and chloride ions. In another embodiment, the high heat copolycarbonates comprise less than 2 ppm of each chloride, sodium, calcium, iron, nickel, copper, and zinc ions as residual impurities.

In another embodiment, which is preferred, the copolycarbonates have a low residual impurity content, in particular less than 2 ppm by weight of each of lithium, sodium, potassium, calcium, magnesium, ammonium, chloride, bromide, fluoride, nitrite, nitrate, phosphite, phosphate, sulfate, acetate, citrate, oxalate, trimethylammonium, and triethylammonium. It is to be understood that the foregoing residual impurities can exist in the thermoplastic compositions in un-ionized form (for example as triethylamine or formic acid), but are determined based on their ionized form.

The residual impurity content can be determined by methods known in the art, for example those described in 2016/0237210 and U.S. Pat. No. 9,287,471 via ion chromatography. For example, determination can be accomplished via ion exchange, of a sample obtained by dissolving 2.4 gram of copolycarbonate in 20 mL of dichloromethane and extracting with 10 mL of distilled, deionized water for 1 hour. The water layer is analyzed by ion chromatography with respect to the desired anions, cations, and amines, in particular fluoride, acetate, formate, chloride, nitrite, bromide, nitrate, phosphite, sulphate, oxalate, phosphate, citrate, lithium, sodium, potassium, ammonium, magnesium, calcium, and diethylamine, and triethylamine. In another embodiment of quantitative analysis of ions, the sample can be submerged in de-ionized water kept at 55° C. for 24 hours, the anions released into the water then analyzed via ion chromatography, e.g., with a Dionex DX500 Ion Chromatograph. Alternatively, quantitative analysis of metals and other compounds can be carried out by conventional inductively coupled plasma emission spectroscopy (ICP) methods to determine the presence of each constituent to the parts per billion (ppb) level.

The high heat copolycarbonates have a weight average molecular weight of 10,000 to 50,000 Daltons, preferably 16,000 to 30,000 Daltons, as measured by gel permeation chromatography (GPC), using a crosslinked styrene-divinylbenzene column and calibrated to bisphenol A homopolycarbonate references. GPC samples are prepared at a concentration of 1 mg per ml, and are eluted at a flow rate of 1.5 ml per minute.

The high heat copolycarbonates have a high glass transition temperature (Tg). The Tg of the high heat copolycarbonates is 155 to 280° C., more preferably 165 to 260° C., even more preferably 185 to 230° C., determined by differential scanning calorimetry (DSC) as per ASTM D3418 with a 20° C./min heating rate.

The high heat copolycarbonates can have high heat resistance. The heat deflection temperature (HDT) of the high heat copolycarbonates is 145 to 270° C., more preferably 155 to 260° C., even more preferably 175 to 220° C., measured flat on a 80×10×4 mm bar with a 64 mm span at 0.45 MPa according to ISO 75/Bf.

The high heat copolycarbonates can have high Vicat softening temperature. In an embodiment, the high heat copolycarbonates have a Vicat B120 of 150 to 275° C., preferably 160 to 255° C., even more preferably 180 to 225° C., measured according to ISO 306.

The high heat copolycarbonates can be present in an amount of 10 to 99 wt % (weight percent), 90 to 99.8 wt %, 20 to 80 wt %, 45 to 75 wt %, or 50 to 70 wt % based on the total weight of the thermoplastic compositions. Preferably the second carbonate units of the high heat copolycarbonates are present in the composition in an amount of 10 to 49 mol %, preferably 13 to 40 mol % or 35 to 49 mol %, more preferably 18 to 35 mol % of second carbonate units based on sum of the moles of the copolycarbonate and the bisphenol A homopolycarbonate.

The high heat copolycarbonates can be produced using a BPA monomer having both a high level of organic purity (e.g., measured by HPLC of greater than or equal to 99.7 wt %) and a sulfur level of less than or equal to 2 parts per million (ppm) as measured by a commercially available Total Sulfur Analysis based on combustion and coulometric detection. The organic purity can be defined as 100 wt % minus the sum of known and unknown impurities detected using ultraviolet (UV) (see HPLC method in Nowakowska et al., Polish J. Appl. Chem., XI(3), 247-254 (1996)). In addition, an end-capping agent is present during manufacture of the high heat copolycarbonate such that high heat copolycarbonate comprises a free hydroxyl level of less than or equal to 200 ppm, more preferably less than or equal to 150 ppm.

Optionally, the thermoplastic compositions include a bisphenol A homopolycarbonate. The bisphenol A homopolymer carbonate can be derived from a bisphenol A monomer having a purity less than 99.7% determined by HPLC. Alternatively, the bisphenol A homopolycarbonate can be derived from a high purity bisphenol A monomer having a purity equal to or greater than 99.7% determined by HPLC.

It has been found by the inventors hereof that the optical properties of the thermoplastic composition can be further improved using bisphenol A homopolycarbonates having specific additional properties. In an embodiment, the bisphenol A homopolycarbonate is manufactured via an interfacial process using a BPA monomer having both a high level of organic purity (e.g., measured by HPLC of greater than or equal to 99.7 wt %) and a sulfur level of less than or equal to 2 parts per million (ppm) as measured by a commercially available Total Sulfur Analysis based on combustion and coulometric detection. The organic purity can be defined as 100 wt % minus the sum of known and unknown impurities detected using ultraviolet (UV) (see HPLC method in Nowakowska et al., Polish J. Appl. Chem., XI(3), 247-254 (1996)). In addition, an end-capping agent is present during manufacture of the bisphenol A homopolycarbonate such that bisphenol A homopolycarbonate comprises a free hydroxyl level less than or equal to 150 ppm. The bisphenol A homopolycarbonate derived from high purity BPA can also have a sulfur level of less than or equal to 2 parts per million (ppm) as measured by a commercially available Total Sulfur Analysis based on combustion and coulometric detection. Bisphenol A homopolycarbonates of high purity, suitable for use in the present compositions, can also be manufactured via the melt process.

These bisphenol A homopolycarbonates are characterized by specific properties. In particular, the preferred bisphenol A homopolycarbonates have a low yellowness index and are heat stable. For example, a molded sample comprising the bisphenol A homopolycarbonate has a yellowness index (YI) of 2.5 or less, 2.0 or less, 1.5 or less, 1.2 or less, or 1.1 or less as measured by ASTM D1925 on a plaque with 2.5 mm thickness. The bisphenol A homopolycarbonates can further be characterized by a molded sample thereof with a thickness of 2.5 mm having an increase in YI ($\Delta$YI) of less than 12, less than 12, or less than 10 after 5,000 hours of heat aging at 130° C. as measured by ASTM D1925. Alternatively, or in addition, the bisphenol A homopolycarbonates can have an increase in YI ($\Delta$YI) of less than 3, less than 2.5, or less than 2 after 2,000 hours of heat aging at 130° C.

The preferred bisphenol A homopolycarbonates are also transparent in the absence of any light diffusers or other fillers. For example, a molded article of the bisphenol A homopolycarbonate has transmission level greater than or equal to 90.0% at 2.5 millimeter (mm) thickness as measured by ASTM D1003-00, Procedure A, measured, e.g., using a HAZE-GUARD DUAL from BYK-Gardner, using and integrating sphere (0°/diffuse geometry), wherein the spectral sensitivity conforms to the International Commission on Illumination (CIE) standard spectral value under standard lamp D65.

Alternatively, the bisphenol A homopolycarbonate can be derived from a bisphenol A monomer having a purity less than 99.70% determined by HPLC, provided that when the bisphenol A homopolycarbonate is derived from a bisphenol A monomer having a purity of less than 99.70%, the high heat copolycarbonate is derived from a high purity BPA so that the BPA purity of the thermoplastic composition is at least 99.6% or at least 99.7% as determined by HPLC.

As used herein, the bisphenol A purity of the thermoplastic composition refers to the overall purity of the bisphenol A monomer used to prepare the high heat copolycarbonate and the bisphenol A homopolymer, if present. The bisphenol A purity of a thermoplastic composition can be determined by a mild depolymerization followed by a HPLC analysis. For example, about 200 milligrams (mg) of the thermoplastic composition is dissolved in 5 ml of tetrahydrofuran (THF) and 2 ml of a 10% solution of potassium hydroxide diluted in methanol. The depolymerization of polycarbonate is carried out with the use of these solvents. The solution is shaken for 2 hours. Then, 2 milliliters (ml) of acetic acid are added to protonate the BPA carbonate salts and decrease the pH. The solution is shaken again for half an hour for homogenization and dissolution of all precipitates. The sample is analyzed by HPLC. The wt % of BPA impurities in the thermoplastic composition can be calculated by:

$$\text{wt \% of impurities in } BPA = \frac{\text{wt \% of impurities} * 254}{228}. \quad \text{(equation 1)}$$

In equation 1, wt % of impurities refers to the impurities percent measured by HPLC after depolymerization. Because the BPA molar mass is different from the carbonated BPA, the wt % of impurities is multiplied by 254 grams per mole (g/mol, or Da) and divide by 228 g/mol. 254 g/mol corresponds to the BPA carbonate molar mass and the BPA molar mass is equal to 228 g/mol. The purity of BPA can be determined by subtracting the wt % of calculated BPA impurities from 100.

In an embodiment, the bisphenol A polycarbonate homopolymer is a linear bisphenol A polycarbonate homopolymer having a weight average molecular weight of 10,000 to 100,000 Daltons, specifically 15,000 to 50,000 Daltons, more specifically 17,000 to 35,000 Daltons, as measured by gel permeation chromatography (GPC), using a crosslinked styrene-divinylbenzene column and calibrated to bisphenol A homopolycarbonate references. GPC samples are prepared at a concentration of 1 mg per ml, and are eluted at a flow rate of 1.5 ml per minute.

More than one bisphenol A polycarbonate homopolymer can be present. For example, the polycarbonate compositions can comprise a first bisphenol A polycarbonate homopolymer having a weight average molecular weight of 20,000 Daltons to 25,000 Daltons and a second bisphenol A polycarbonate homopolymer having a weight average molecular weight of 28,000 to 32,000 Daltons, or a second bisphenol A polycarbonate homopolymer having a weight average molecular weight of 16,000 Daltons to 20,000 Daltons, each measured by GPC using bisphenol A homopolycarbonate standards. The weight ratio of the first bisphenol A polycarbonate homopolymer relative to the second bisphenol A polycarbonate homopolymer is 10:1 to 1:10, specifically 5:1 to 1:5, more specifically 3:1 to 1:3 or 2:1 to 1:2.

The polycarbonate homopolymer can be present in an amount of 10 to 90 wt %, preferably 10 to 80 wt %, 10 to 60 wt %, 15 to 50 wt %, or 25 to 55 wt %, or 30 to 50 wt %, each based on the total weight of the thermoplastic composition.

In some embodiments, it can be advantageous to use copolycarbonates and bisphenol A homopolycarbonates with very low residual contents of volatile impurities. For example, the polymer components can have a content of chlorobenzene and other aromatic chlorine compounds of less than 10 ppm, preferably less than 5 ppm and more preferably less than 2 ppm, dichloromethane of less than 1 ppm, preferably less than 0.5 ppm, monohydric phenols such as phenol, tert-butylphenol and cumylphenol of less than 15 ppm, preferably less than 5 ppm and more preferably less than 2 ppm, and alkanes of less than 10 ppm, preferably less than 5 ppm. In other embodiments, the polymers can preferably have residual contents of: carbon tetrachloride of less than 0.01 ppm, diaryl carbonates, in particular diphenyl carbonate and di-tert-butyl phenolcarbonate, of less than 5 ppm, preferably less than 2 ppm, bisphenol A and other bisphenols of less than 5 ppm, preferably less than 2 ppm and more preferably less than 0.5 ppm, sodium and other alkali metals and alkaline earth metals of less than 0.05 ppm, cresols of less than 1 ppm, preferably less than 0.2 ppm, phenolic OH groups of less than 300 ppm, preferably less than 200 ppm, more preferably less than 100 ppm, alkaline earth metals of less than 0.1 ppm, more preferably less than 0.05 ppm, pyridine of less than 1 ppm, preferably less than 0.1 ppm, nonhalogenated aromatic compounds such as xylene and toluene of less than 10 ppm, preferably less than 5 ppm. Methods for obtaining and measuring these amount is described, for example, in US2012/0157653.

The polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_1$-$C_{22}$alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Combinations comprising linear polycarbonates and branched polycarbonates can be used.

It has been found that including an acid stabilizer in the thermoplastic compositions can further improve the color stability of the compositions after the compositions are molded under aggressive conditions and/or after the compositions are aged at an elevated temperature for a prolonged period of time.

Any Arrhenius acid (i.e., protic acid) can be used so long as the type and amount selected is such that molding properties are improved, and color and polycarbonate degradation are minimized. Any acid with a pKa of less than or equal to about 5 (measured in water) can be used. Use of a stronger acid, i.e., an acid having a pKa (measured in water) of less or equal to about 2, specifically about 2 to about −1, over a weaker acid, i.e., having a pKa (measured in water) of greater than about 2, specifically greater than about 2 to about 4.5, has a stronger effect on both molding and heat aging. Lower amounts of the stronger acid can therefore be used relative to the weaker acid, for the same color stabilization effect. In one embodiment, a stronger acid having a pKa of less than 2 is used; in other embodiments, a weaker acid having a pKa of greater than 2 is used. In some embodiments, an acid having a pKa of less than 4.5 is used. Exemplary acid stabilizers include a Bronsted acid, a Lewis acid, an acid or an ester thereof containing a sulfur atom, or a combination comprising at least one of the foregoing.

Acid stabilizers can include, in an embodiment, phosphoric acid; phosphorus acid; hypophosphorous acid; pyrophosphoric acid; polyphosphoric acid; an organo sulfonic stabilizer; sulfurous acids; ammonium salts of sulfuric acids, halogenated carboxylic acids such as, for example, trifluoroacetic acid, trichloroacetic acid, and the like. In an exemplary embodiment, a useful weaker acid is phosphoric acid or phosphorous acid, and a useful stronger acid is p-toluenesulfonic acid.

The organosulfonic stabilizer can be an aryl or aliphatic sulfonic acid, including a polymer thereof, an aryl or an aliphatic sulfonic acid anhydride, or an aryl or aliphatic ester of an aryl or aliphatic sulfonic acid, or a polymer thereof. In particular, the organosulfonic stabilizer is a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer; an anhydride of a $C_{1-30}$ alkyl sulfonic acid, a $C_{6-30}$ aryl sulfonic acid, a $C_{7-30}$ alkylarylene sulfonic acid, or a $C_{7-30}$ arylalkylene sulfonic acid; or a $C_{6-30}$ aryl ester of a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer; or a $C_{1-30}$ aliphatic ester of a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer. A combination of one or more of the foregoing can be used.

In preferred embodiments, the organosulfonic stabilizers are represented by formula (8)

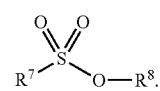

In formula (8), $R^7$ is each independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its corresponding $C_{1-32}$ alkyl ester. The $C_{2-32}$ ethylenically unsaturated aromatic sulfonic acid can be of the formula

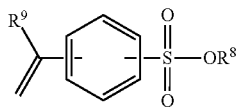

wherein $R^9$ is hydrogen or methyl, and $R^8$ is as defined in formula (8). Preferably the ethylenically unsaturated group and the sulfonic acid or ester group are located para on the phenyl ring.

Further in formula (8), $R^8$ is hydrogen; or $R^8$ is $C_{1-30}$ alkyl; or $R^8$ is a group of the formula —S(=O)$_2$—$R^7$. When $R^8$ is a group of the formula —S(=O)$_2$—$R^7$, each $R^7$ in the compound of formula (8) can be the same or different, but preferably each $R^7$ is the same.

In an embodiment in formula (8), $R^7$ is a $C_{6-12}$ aryl, $C_{7-24}$ alkylarylene, or a polymer unit derived from a $C_{2-14}$ ethylenically unsaturated aromatic sulfonic acid or its ester; and $R^8$ is hydrogen, $C_{1-24}$ alkyl, or a group of the formula —S(=O)$_2$—$R^7$ wherein $R^7$ is a $C_{6-12}$ aryl or $C_{7-24}$ alkylarylene.

In a preferred embodiment, $R^7$ is a $C_{7-10}$ alkylarylene or a polymer unit derived from a $C_{2-14}$ ethylenically unsaturated aromatic sulfonic acid, and $R^8$ is a hydrogen, $C_{1-25}$ alkyl, or a group of the formula —S(=O)$_2$—$R^7$ wherein $R^7$ is a $C_{7-10}$ alkylarylene. In a specific embodiment, $R^7$ is a $C_{7-10}$ alkylarylene and $R^8$ is a hydrogen or $C_{1-6}$ alkyl. In still another embodiment, $R^7$ is a $C_{7-10}$ alkylarylene and $R^8$ is a hydrogen or $C_{12-25}$ alkyl, or $R^8$ is a $C_{14-20}$ alkyl.

In specific embodiment, $R^7$ is a polymer unit derived from a $C_{2-14}$ ethylenically unsaturated aromatic sulfonic acid, preferably p-styrene sulfonic acid or para-methyl styrene sulfonic acid, such that in formula (8) $R^8$ is hydrogen.

In an embodiment, the organosulfonic stabilizer is a $C_{1-10}$ alkyl ester of a $C_{7-12}$ alkylarylene sulfonic acid, preferably of p-toluene sulfonic acid. More preferably the stabilizer is a $C_{1-6}$ alkyl ester of p-toluene sulfonic acid, and even more preferably is butyl tosylate.

In another embodiment, the organosulfonic stabilizer is an anhydride of a $C_{7-12}$ alkylarylene sulfonic acid, preferably para-toluene sulfonic anhydride.

In still another embodiment, $R^7$ is a $C_{11-24}$ alkylarylene sulfonic acid, and $R^8$ is hydrogen. Alternatively, $R^7$ is a $C_{16-22}$ alkylarylene sulfonic acid, and $R^8$ is hydrogen.

The acid stabilizer can be used in an amount of 1 ppm to 40 ppm, preferably 4 ppm to 20 ppm or 6 ppm to 10 ppm, by weight based on the total weight of the thermoplastic composition.

The thermoplastic composition can also contain an epoxy additive. Epoxy compounds useful as additives include epoxy modified acrylic oligomers or polymers (such as a styrene-acrylate-epoxy polymer, prepared from for example a combination of: a substituted or unsubstituted styrene such as styrene or 4-methylstyrene; an acrylate or methacrylate ester of a $C_{1-22}$ alkyl alcohol such as methyl acrylate, methyl methacrylate, ethyl acrylate, butyl acrylate, or the like; and an epoxy-functionalized acrylate such as glycidyl acrylate, glycidyl methacrylate, 2-(3,4-epoxycyclohexyl)ethyl acrylate, 2-(3,4-epoxycyclohexyl)ethyl methacrylate, or the like), or an epoxy carboxylate oligomer based on cycloaliphatic epoxides (such as, for example, 3,4-epoxycyclohexylmethyl-3,4-epoxycyclohexylcarboxylate, or the like). Specific commercially available exemplary epoxy functionalized stabilizers include Cycloaliphatic Epoxide Resin ERL-4221 supplied by Union Carbide Corporation (a subsidiary of Dow Chemical), Danbury, Conn.; and epoxy modified acrylates such as JONCRYL ADR-4300 and JONCRYL ADR-4368, available from BASF. Epoxy additives are typically used in amounts of up to 1 wt %, specifically 0.001 to 1 wt %, more specifically 0.001 to 0.5 wt %, based on the total weight of the thermoplastic composition. In an embodiment, the epoxy additive can be included in an amount of 0.001 to 0.3 wt %, specifically 0.01 to 0.3 wt %, and more specifically 0.1 to 0.3 wt %, based on the total weight of the thermoplastic composition. Use of greater amounts of epoxy compound may cause more splay, i.e., mold lines which fan outward from the point of injection into the mold, and observable to the unaided eye in molded articles comprising the thermoplastic composition.

The thermoplastic compositions can include various additives ordinarily incorporated into polymer compositions of this type, with the proviso that the additive(s) are selected so as to not significantly adversely affect the desired properties of the thermoplastic composition, in particular melt flow, thermal, transparency, and surface properties. Such additives can be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as titanium dioxide, carbon black, and organic dyes, surface effect additives, radiation stabilizers, flame retardants, anti-drip agents, and impact modifiers. In an embodiment, the thermoplastic composition further comprises a processing aid, a heat stabilizer, an ultraviolet light absorber, a colorant, a flame retardant, an impact modifier, or a combination thereof. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0 to 5 wt % or 0.01 to 5 wt %, based on the total weight of the thermoplastic composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Heat stabilizer additives include organophosphites such as triphenyl phosphite, tris-(2,6-dimethylphenyl)phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 parts by weight, based on 100 parts by weight of the total composition, excluding any filler.

Light stabilizers, including ultraviolet light (UV) absorbers, can also be used. Light stabilizers include benzotriazoles such as 2-(2-hydroxy-5-methylphenyl)benzotriazole and 2-(2-hydroxy-5-tert-octylphenyl)-benzotriazole, 2-hydroxy-4-n-octoxy benzophenone, or combinations comprising at least one of the foregoing light stabilizers. UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB* 5411); 2-hydroxy-4-n-octyloxybenzophenone (CYASORB* 531); 2[4,6-bis(2,4-dimethylphenyl)-1,3,5-triazin-2-yl]-5-(octyloxy)-phenol (CYASORB* 1164); 2,2'-(1,4-phenylene)bis(4H-3,1-benzoxazin-4-one) (CYASORB* UV-3638); 1,3-bis[(2-cyano-3,3-diphenylacryloyl)oxy]-2,2-bis[[(2-cyano-3, 3-diphenylacryloyl)oxy]methyl]propane (UVINUL* 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; phenol, 2-(2H-benzotriazol-2-yl)-4,6-bis(1-methyl-1-phenylethyl)-(TINUVIN* 234); BCAP bismalonate from Clariant; nano-size inorganic materials such as titanium oxide, cerium oxide, and zinc oxide, all with particle size less than or equal to 100 nanometers; or combinations comprising at least one of the foregoing UV absorbers. Light stabilizers are used in amounts of 0.01 to 5 parts by weight, based on 100 parts by weight of the thermoplastic composition, excluding any filler.

Flame retardants can also be used. Flame retardants include flame retardant salts such as alkali metal salts of perfluorinated $C_{1-16}$ alkyl sulfonates such as potassium perfluorobutane sulfonate (Rimar salt), potassium perfluorooctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein. Flame retardant salts are typically used in amounts of 0.01 to 1.0 parts by weight, based on 100 parts by weight of the thermoplastic composition.

Organophosphorus flame retardants can be used. Organophosphorus compounds include aromatic organophosphorus compounds having at least one organic aromatic group and at least one phosphorus-containing group, as well as organic compounds having at least one phosphorus-nitrogen bond.

In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the phosphorus-containing group, or bonded via another moiety, for example an alkylene group. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol A), a monoarylene group (e.g., a 1,3-phenylene or a 1,4-phenylene), or a combination thereof.

The phosphorus-containing group can be a phosphate $(P(=O)(OR)_3)$, phosphite $(P(OR)_3)$, phosphonate $(RP(=O)(OR)_2)$, phosphinate $(R_2P(=O)(OR))$, phosphine oxide $(R_3P(=O))$, or phosphine $(R_3P)$, wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula $(GO)_3P=O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below

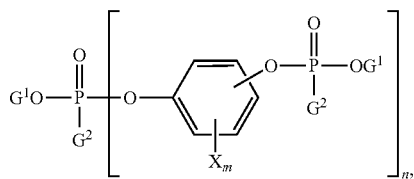

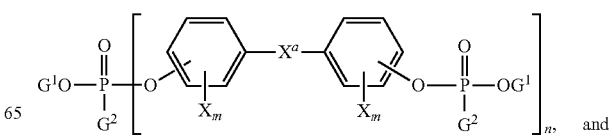

and

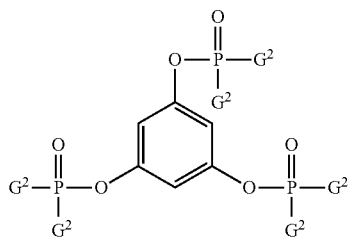

wherein each $G^1$ is independently a $C_{1-30}$ hydrocarbyl; each $G^2$ is independently a $C_{1-30}$ hydrocarbyl or hydrocarbyloxy; each X is independently a bromine or chlorine; m is 0 to 4, and n is 1 to 30. Di- or polyfunctional aromatic phosphorus-containing compounds of this type include resorcinol tetraphenyl diphosphate (RDP), the bis(diphenyl) phosphate of hydroquinone and the bis(diphenyl) phosphate of bisphenol A, respectively, their oligomeric and polymeric counterparts, and the like.

Specific aromatic organophosphorus compounds have two or more phosphorus-containing groups, and are inclusive of acid esters of the formula (9)

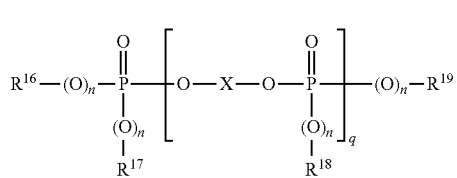

(9)

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some embodiments $R^{16}$, $R^{17}$, $R^{18}$, and $R^{19}$ are each independently $C_{1-4}$ alkyl, naphthyl, phenyl $(C_{1-4})$alkylene, or aryl groups optionally substituted by $C_{1-4}$ alkyl. Specific aryl moieties are cresyl, phenyl, xylenyl, propylphenyl, or butylphenyl. In some embodiments X in formula (9) is a mono- or poly-nuclear aromatic $C_{6-30}$ moiety derived from a diphenol. Further in formula (9), n is each independently 0 or 1; in some embodiments n is equal to 1. Also in formula (9), q is from 0.5 to 30, from 0.8 to 15, from 1 to 5, or from 1 to 2. Specifically, X can be represented by the following divalent groups (9), or a combination comprising one or more of these divalent groups.

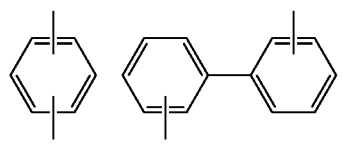

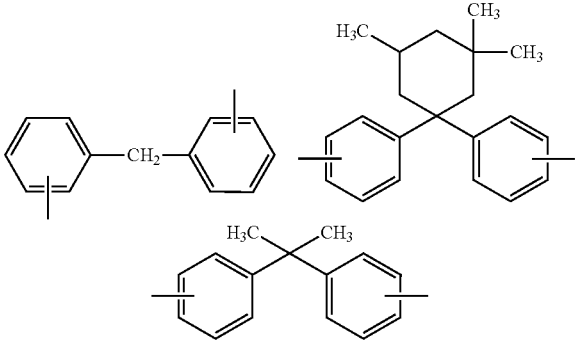

In these embodiments, each of $R^{16}$, $R^{17}$, $R^{18}$, and $R^{19}$ can be aromatic, i.e., phenyl, n is 1, and p is 1-5, specifically 1-2. In some embodiments at least one of $R^{16}$, $R^{17}$, $R^{18}$, $R^{19}$, and X corresponds to a monomer used to form the polycarbonate, e.g., bisphenol A or resorcinol. In another embodiment, X is derived especially from resorcinol, hydroquinone, bisphenol A, or diphenylphenol, and $R^{16}$, $R^{17}$, $R^{18}$, $R^{19}$, is aromatic, specifically phenyl. A specific aromatic organophosphorus compound of this type is resorcinol bis(diphenyl phosphate), also known as RDP. Another specific class of aromatic organophosphorus compounds having two or more phosphorus-containing groups are compounds of formula (10)

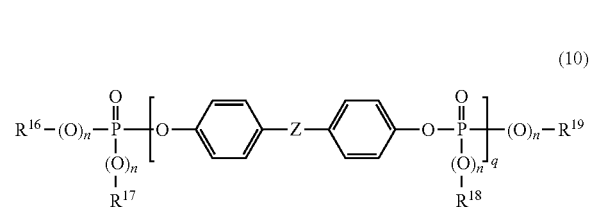

(10)

wherein $R^{16}$, $R^{17}$, $R^{18}$, $R^{19}$, n, and q are as defined for formula (9) and wherein Z is $C_{1-7}$ alkylidene, $C_{1-7}$ alkylene, $C_{5-12}$ cycloalkylidene, —O—, —S—, —SO$_2$—, or —CO—, specifically isopropylidene. A specific aromatic organophosphorus compound of this type is bisphenol A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Organophosphorus compounds containing at least one phosphorus-nitrogen bond includes phosphazenes, phosphorus ester amides, phosphoric acid amides, phosphonic acid amides, phosphinic acid amides, and tris(aziridinyl) phosphine oxide. Phosphazenes (11) and cyclic phosphazenes (12)

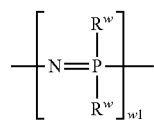

(11)

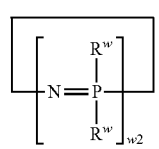

(12)

in particular can used, wherein w1 is 3 to 10,000 and w2 is 3 to 25, specifically 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

Depending on the particular organophosphorus compound used, the thermoplastic compositions can comprise 0.5 to 15 wt % or 3.5 to 12 wt % of the organophosphorus flame retardant, each based on the total weight of the composition. Specifically, the organophosphorus compounds can be bisphenol A bis(diphenyl phosphate), triphenyl phosphate, resorcinol bis(diphenyl phosphate), tricresyl phosphate, or a combination thereof.

The thermoplastic compositions can further comprise a cyclic siloxane and/or a linear siloxane to impart fire/flame-retardant properties. The cyclic siloxane can include those with the general formula below

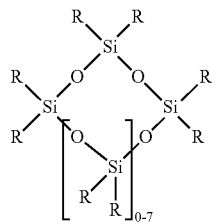

wherein R is each independently $C_{1-36}$ alkyl, fluorinated or perfluorinated $C_{1-36}$ alkyl, $C_{1-36}$ alkoxy, $C_{6-14}$ aryl, aryloxy of 6 to 14 carbon atoms, arylalkoxy of 7 to 36 carbon atoms, or $C_{1-36}$ alkyl-substituted aryl of 6 to 14 carbon atoms. In an embodiment, at least one R may be a phenyl. Examples of cyclic siloxanes include, but not limited to, a cyclic phenyl containing siloxane, octaphenylcyclotetrasiloxane, hexamethylcyclotrisiloxane, octamethylcyclotetrasiloxane, decamethylcyclopentasiloxane, dodecamethylcyclohexasiloxane, trimethyltriphenylcyclotrisiloxane, and tetramethyltetraphenylcyclotetrasiloxane. Octaphenylcyclotetrasiloxane is specifically mentioned.

Linear siloxanes can also be used. The linear siloxanes can be a linear phenyl containing siloxane such as a poly(phenylmethylsiloxane). In an embodiment, the thermoplastic compositions contain 0.01% to 1% of a cyclic siloxane, a linear siloxane, or a combination thereof.

The thermoplastic compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

The thermoplastic compositions can have a glass transition temperature of 155° C. or higher, preferably 155° C. to 280° C., more preferably 165° C. to 260° C., and even more preferably 185° C. to 230° C., determined by differential scanning calorimetry (DSC) as per ASTM D3418 with a 20° C./min heating rate.

The thermoplastic compositions can have high heat resistance. The heat deflection temperature (HDT) of the thermoplastic compositions is 150° C. or higher, preferably 150 to 270° C., more preferably 155 to 260° C., even more preferably 175 to 220° C., measured flat on a 80×10×4 mm bar with a 64 mm span at 0.45 MPa according to ISO 75/Bf.

The thermoplastic compositions can have high Vicat softening temperature. In an embodiment, the thermoplastic compositions have a Vicat B120 of a Vicat B120 of 155° C. or higher, preferably 165° C. or higher, more preferably 180° C. or higher as measured according to ISO 306.

The thermoplastic compositions can have excellent transparency. In an embodiment, the thermoplastic compositions have a haze less of less than 1.5, more preferably less than 1.0, more preferably less than 0.5%, and a transmission greater than 86%, more preferably greater than 88%, more preferably greater than 89%, even more preferably greater than 90%, each measured according to ASTM D1003-00 using the color space CIE1931 (Illuminant C and a 2° observer) with a 1.0 mm thickness. The thermoplastic compositions can have a haze of less than 1.5, or less than 1.0 and a total transmission greater than 84% or greater than 86%, each measured according to ASTM D1003-00 using the color space CIE1931 (Illuminant C and a 2° observer) on a molded plaque with a 3.0 mm thickness. The thermoplastic compositions are molded under standard molding conditions in range of 300 to 350.0 depending on the glass transition temperature of the composition. For example, the thermoplastic compositions are molded at a temperature of 100° C. to 175° C. above the glass transition temperature of the thermoplastic composition for a residence time of 2 to 20 minutes.

The thermoplastic compositions can have excellent transparency in the infrared wavelength range. In an embodiment, the thermoplastic compositions have a transmission at wavelength of 940 nm of greater than 88%, or greater than 89% or greater than 90% measured with Perkin Elmer 950 spectrometer equipped with 15 cm integrated sphere on a molded plaque with a thickness of 1 mm; and a refractive index of greater than 1.59 or greater than 1.60 at 587.6 nm or a refractive index of greater than 1.57 or greater than 1.58 at 940 nm measured according to IS 489 on a molded plaque with a thickness of 1 mm. The compositions can have a transmission at wavelength of 840 nm of greater than 88.0%, preferably greater than 89.0%, more preferably greater than 90.0%, as measured with Perkin Elmer 950 spectrometer equipped with 15 cm integrated sphere on 1 mm. The compositions have a transmission at wavelength of 550 nm of greater than 85%, or greater than 87% or greater than 88% measured with Perkin Elmer 950 spectrometer equipped with 15 cm integrated sphere on a molded plaque with a thickness of 1 mm; and the compositions can have a transmission at wavelength of 400 nm of greater than 75%, or greater than 80% or greater than 85% measured with Perkin Elmer 950 spectrometer equipped with 15 cm integrated sphere on a molded plaque with a thickness of 1 mm. In still another embodiment, the compositions have a transmission at wavelength of 1310 nm of greater than 87%, preferably greater than 88.0%, more preferably greater than 89.0%, as measured with Perkin Elmer 950 spectrometer equipped with 15 cm integrated sphere on 1 mm.

The thermoplastic compositions have an Abbe number of less than 32 or less than 30 measured according to ISO 489 on a molded plaque with a thickness of 1 mm.

The thermoplastic compositions have a melt volume flow rate (MVR) greater than 10 cc/min or greater than 12 cc/min or greater than 15 cc/min, measured at 330° C./2.16 Kg at 360 second dwell according to ISO 1133.

The thermoplastic compositions have an Izod notched impact energy of at least 6 kJ/m$^2$, or of at least 8 kJ/m$^2$, as measured at 23° C. according to ISO 180/1A using a multipurpose test specimen in accordance with ISO 3167 TYPE A. The thermoplastic compositions can have an Izod notched impact energy of at least 70 J/m, or of at least 88 J/m, as measured at 23° C. according to ASTM D256.

The thermoplastic compositions have excellent color stability during exposure for prolonged time at elevated temperatures in the absence of moisture, referred to further as heat ageing. The thermoplastic compositions can have an increase in yellowness index of less than 5, less than 4, more preferably less than 3, during 1500 hours of heat aging at 140° C., as measured by ASTM D1925 on a 1.0 mm thick molded plaque. The thermoplastic compositions have an increase in yellowness index of less than 15, equal to or less than 10, or equal to or less than 7 during 1000 hours of heat aging at 155° C., as measured by ASTM D1925 on a 1 mm thick molded plaque. In an embodiment, the thermoplastic compositions can have an increase in yellowness index of less than 10, more preferably less than 8, more preferably less than 6, during 1500 hours of heat aging at 155° C., as measured by ASTM D1925 on a 1.0 mm thick molded plaque. The thermoplastic compositions can have an increase in yellowness index of less than 20, more preferably less than 10, more preferably less than 5, during 1000 hours of heat aging at 160° C., as measured by ASTM D1925 on a 2.5 mm thick molded plaque. In still another embodiment, the thermoplastic compositions can have an increase in yellowness index of less than 20, more preferably less than 10, more preferably less than 5, during 500 hours of heat aging at 170° C., as measured by ASTM D1925 on a 2.5 mm thick molded plaque.

The thermoplastic compositions have excellent color stability during exposure for prolonged time at elevated temperatures in the presence of moisture, referred to further as hydro ageing. In an embodiment, the thermoplastic compositions have an increase in yellowness index of less than 5, more preferably less than 3, more preferably less than 1, after 1000 hours of hydro ageing at 80° C. and 85% relative humidity, as measured by ASTM D1925 on a 2.5 mm thick molded plaque. In another embodiment, the thermoplastic compositions have an increase in yellowness index of less than 0.5, or of less than 0.3 after 100 hours of hydro ageing at 121° C. in an autoclave, as measured by ASTM D1925 on a 2.5 mm thick molded plaque.

The thermoplastic compositions have excellent color stability during exposure for prolonged time to autoclave conditions or multiple cycle of autoclave sterilization. In an embodiment, the thermoplastic compositions have an increase in yellowness index of less than 2, more preferably less than 1, after 100 hours of autoclaving at 121° C., as measured by ASTM D1925 on a 2.5 mm thick molded plaque. In another embodiment, the thermoplastic compositions have an increase in yellowness index of less than 5, more preferably less than 3, more preferably less than 1, after 100 hours of autoclaving at 134° C., as measured by ASTM D1925 on a 2.5 mm thick molded plaque. In an embodiment, the thermoplastic compositions have an increase in yellowness index of less than 10, more preferably less than 5, more preferably less than 3, after 100 hours of autoclaving at 143° C., as measured by ASTM D1925 on a 2.5 mm thick molded plaque.

The thermoplastic compositions can have excellent color after molding under demanding conditions. In an embodiment, the thermoplastic compositions have a yellowness index of less than 20, more preferably less than 10, more preferably less than 5, more preferably less than 3, as measured by ASTM D1925 on a 2.5 mm plaque. For example, the thermoplastic compositions are molded at a temperature of 100 to 175° C. above the glass transition temperature of the thermoplastic composition for a residence time of 2 to 20 minutes. Typical conditions would be molding at melt temperatures of 350° C. or higher and residence times of 3 min or longer.

In an embodiment, the thermoplastic composition has a yellowness index which is at least 20% or at least 30% lower compared to the same composition having a Bisphenol A purity below 99.6% or below 99.5%, as measured by ASTM D1925 on a 2.5 mm thick molded plaque with a melt temperature of 355° C. and a residence time of 10 min. In another embodiment, the thermoplastic compositions have a yellowness index of less than 10 measured according to ASTM D1925 on a plaque of 2.5 mm thickness molded at a temperature of 355° C. for a residence time of 10 minutes.

The thermoplastic compositions can have a change in yellowness index of less than 100%, more preferably less than 50%, more preferably less than 30%, following molding under aggressive conditions as compared to a reference article of an identical composition molded under standard process conditions, when tested at thickness of 2.5 mm determined according to ASTM D1925. As used herein, aggressive molding conditions include a molding temperature of equal to or greater than 330° C., and standard molding conditions include a molding temperature of less than 330° C.

The thermoplastic compositions can have a yellowness index (YI) determined according to ASTM D1925 at least 30% lower, more preferably at least 50% lower, more preferably at least 75% lower, as compared to a reference sample of an otherwise identical composition A molded part of the composition with a thickness of 2.5 mm has a yellowness index (YI) determined according to ASTM D1925 at least 30% lower, more preferably at least 50% lower, more preferably at least 75% lower, as compared to the same composition having a Bisphenol A purity below 99.6% or below 99.5%, following molding at a temperature of equal to or greater than 330° C. for a residence time of 10 minutes.

The thermoplastic compositions can have good flame retardant properties. Flammability tests are performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as HB, V0, UL94 V1, V2, VA and/or VB. In an embodiment, the thermoplastic compositions have a UL94-V0 rating at a thickness of 2.5 mm or higher; or a UL94-V2 rating at a thickness of 0.8 mm to 1.5 mm.

Shaped, formed, or molded articles comprising the thermoplastic compositions are also provided. The compositions can be molded into useful shaped articles by a variety of methods, such as injection molding, injection-compression molding, heat-cool molding, extrusion, rotational molding, blow molding, and thermoforming. The article can be a molded article, a thermoformed article, an extruded article, an extruded layer (a film or a sheet), one or more layers of a multi-layer article, a substrate for a coated article, or a substrate for a metallized article made from the thermoplastic composition. The multi-layer article can be a laminated multi-layer article. The distinction between a film and a sheet is not critical. A film can have an exemplary thickness of 100 micrometers to 5 millimeter, and the sheet can have an exemplary thickness of 5 millimeters to 5 centimeters.

Advantageously, the articles have no significant part distortion or discoloration when the articles are subjected to a secondary operation such as over-molding, lead-free soldering, wave soldering, low temperature soldering, or coating with high temperature curing, or a combination thereof. High temperature cure of the coating can be, for example, 100° C. or higher, for example 100 to 250° C. In some embodiments, "no significant part distortion" includes a volume distortion of less than 10 volume percent (vol %), or less than 5 vol %, or less than 1 vol %. Significant discoloration can be detected by the unaided eye at a distance of 18 inches.

In some embodiments, at least a portion of a surface of the article is metallized or is coated with a hardcoat, a UV-protective coat, an anti-refractive coat, an anti-reflective coat, a scratch-resistant coat, or a combination comprising at least one of the foregoing. In some embodiments, the coating is applied or cured at a temperature of 100° C. or higher, for example 100 to 250° C.

The article can be a lens (e.g., a camera lens, a mobile phone camera lens, a table camera lens, a security camera lens, an automotive camera lens, a scanner lens, an illumination device lens, a safety glass lens, an ophthalmic corrective lens, a projector lens, an imaging lens, an auto lens, a sensor lens (for example a proximity sensor lens, a gesture control lens, or an infrared sensor lens)), a light guide, a waveguide, a collimator, an optical fiber, a visor, a window, a door, a display screen, an electronic device, a scientific or medical device (e.g., a blood bag, a solution bag, an intravenous connector, a catheter, a medical storage tray, medical tubing, a cannula, an implantable prosthesis, a heart valve, a vascular graft, a pacemaker lead, a defibrillator lead, an A-V shunt, a Petri dish), an autoclavable article, a safety shield, a fire shield, wire or cable sheathing, a tray, a screen, an enclosure, a dish, glazing, packaging, a gas barrier, an anti-fog layer, or an anti-reflective layer.

In addition, the copolycarbonate compositions can be used as a component of a wide variety of devices and applications, for example a component of a device comprising a lens, such as a camera, a mobile phone camera, a flashlight, a sensor such as a touch sensor, a proximity sensor, a gesture control sensor, or an infrared sensor, ophthalmic corrective glasses, safety glasses, an illumination device, a lighthouse, a light emitting diode (LED), or a vehicle (e.g., a lens holder, a reflector, a camera flash lens, a vehicle headlight, running light, foglight, or rearlight). Other articles include a device comprising a light guide, a device comprising a waveguide, a device comprising a collimator, a device comprising an optical fiber, a device comprising an optical film, a device comprising a device comprising a lighting element, including LEDs and OLEDs (e.g., a light bulb, a housing, a cover, a bezel, a vehicle headlight, running light, foglight, or rearlight, a flashlight, a reflector, or a signal indicator), a device comprising a window, such as a domestic appliance, vehicle, or building, an device comprising a door, such as a domestic appliance, vehicle, or building, or a device comprising a tray (e.g., a food tray for a vehicle). Still other articles include a component of a scientific or medical device (e.g., a syringe, a blood filter housing, a blood bag, a solution bag, an intravenous connector, a dialyzer, a catheter, a medical storage tray, a medical appliance, medical tubing, a cardiac pacemaker, a cardiac defibrillator, a cannula, an implantable prosthesis, a cardiac assist device, a heart valve, a vascular graft, an extra-corporeal device, an artificial organ, a pacemaker lead, a defibrillator lead, a blood pump, a balloon pump, an A-V shunt, a membrane for cell encapsulation, a wound dressing, an artificial joint, an orthopedic implant a Petrie dish, a face shield, a respirator, a sensor), an autoclavable article (e.g., a medical or scientific device or a food handling device, either of which can be a tray, dish, syringe, container, or the like), a component of an electronic device such as a handheld electronic device, a tablet, a computer, a monitor, a business machine such as a copier, a fuse, an analytical device, or a sensor (e.g., a housing, an electrical connector, for any of the foregoing), a component of a photovoltaic device, a component of a safety device (e.g., a visor, a safety goggle, a face shield, a fire shield, a helmet, a respirator, a knee pad, elbow pad, or other protective body part pad), a component of a display screen, including a liquid crystal display screen, or an organic light-emitting diode display screen, a component of a dish, a component of a heater, such as a watercooler, a component of a mold, for example for foodstuffs such as chocolate, a component of a screen such as a mining ore screen, a component of a conveyor such as a conveyor belt, a component of an enclosure such as an animal cage, a structural component of a building, a vehicle, or an appliance such as a pump, a microwave, a dishwasher, or a stove, a component of packaging, a component of a gas barrier, a component of an encapsulant, a component of a label, a component of a gas barrier, a component of an anti-fog assembly, or a component of an anti-reflective assembly.

The invention is further illustrated by the following non-limiting examples.

EXAMPLES

The materials used in the Examples are described in Table 1.

TABLE 1

| Component | Chemical Description | Source |
| --- | --- | --- |
| CPC-1 | PPP-BP (N-phenylphenolphthaleinylbisphenol, 2,2-bis(4-hydro)-bisphenol A polycarbonate copolymer, 33 mol % PPP-BP, Mw = 21-25 kDa as determined by GPC using bisphenol A polycarbonate standards, para-cumylphenol (PCP) end-capped, with BPA carbonate units derived from BPA having 99.4-99.5% purity | SABIC |
| CPC-2 | PPP-BP (N-phenylphenolphthaleinylbisphenol, 2,2-bis(4-hydro)-Bisphenol A polycarbonate copolymer, 33 mol % PPP-BP, Mw = 22-23 kDa as determined by GPC using | SABIC |

TABLE 1-continued

| Component | Chemical Description | Source |
|---|---|---|
| | BPA polycarbonate standards, para-cumylphenol (PCP) end-capped, with BPA carbonate units derived from BPA having 99.7% purity | |
| PC-1A | Linear Bisphenol A polycarbonate, produced via interfacial polymerization from BPA having a purity of 99.4-99.5% wt % determined by HPLC, Mw = 30-31 kDa as determined by GPC using BPA polycarbonate standards, phenol end-capped | SABIC |
| PC-1B | Linear Bisphenol A polycarbonate, produced via interfacial polymerization from BPA having a purity of 99.7 wt % determined by HPLC, Mw = 30-31 kDa as determined by GPC using BPA polycarbonate standards, phenol end-capped | SABIC |
| PC-2A | Linear Bisphenol A polycarbonate, produced via interfacial polymerization from BPA having a purity of 99.4-99.5% wt % determined by HPLC, Mw = 22-23 kDa as determined by GPC using BPA polycarbonate standards, PCP end-capped | SABIC |
| PC-2B | Linear Bisphenol A polycarbonate, produced via interfacial polymerization from BPA having a purity of 99.7 wt % determined by HPLC, Mw = 22-23 kDa as determined by GPC using BPA polycarbonate standards, PCP end-capped | SABIC |
| PC3 | Linear Bisphenol A polycarbonate, produced via interfacial polymerization from BPA having a purity of 99.4-99.5 wt % determined by HPLC, Mw = 18-19 kDa as determined by GPC using BPA polycarbonate standards, PCP end-capped. | SABIC |
| Tosylate Premix-1 | Premix of 0.06 wt % of butyl tosylate in PC-2A | SABIC |
| Tosylate Premix-2 | Premix of 0.3 wt % of butyl tosylate in PC-2A | SABIC |
| AO-1 | Tris(2,4-di-t-butylphenyl)phosphite (IRGAFOS 168) | Ciba |
| AO-2 | Octadecyl-3-(3,5-di-tert-butyl-4-hydroxyphenyl) propionate IRGANOX 1076 | BASF |
| PETS | Palmitic/stearic acid (50/50) ester of dipenta/pentaerythritol (Loxiol EP8578) | Cognis Oleochemicals |
| $H_3PO_3$ Premix | Premix of 0.6262 wt % of a 45 wt % of phosphorous acid aqueous solution in PC-1 | Aldrich |
| UVA 234 | 2-[2-hydroxy-3,5-di-(1,1-dimethylbenyl)]-2H-benzotriazol | BASF |

Blending, Extrusion, and Molding Conditions

The compositions were made as follows. All solid were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The liquid additives, if any, were fed before the vacuum using a liquid injection system. It will be recognized by one skilled in the art that the method is not limited to these processing steps or processing equipment.

Extrusion of all materials was performed on a 25 mm Werner-Pfleiderer ZAK twin-screw extruder (L/D ratio of 33/1) with a vacuum port located near the die face. The extruder has 9 zones, which were set at temperatures of 40° C. (feed zone), 200° C. (zone 1), 250° C. (zone 2), 270° C. (zone 3) and 290-330° C. (zone 4 to 8). Screw speed was 300 rpm and throughput was between 10 and 25 kg/hr.

The compositions were molded after drying at 100-110° C. for 6 hours on a 45-ton Engel molding machine with 22 mm screw or 75-ton Engel molding machine with 30 mm screw operating at a temperature 310 to 360° C. with a mold temperature of 80 to 150° C.

Testing Methods

Yellowness Index (YI) was calculated from the transmission spectrum from a MacBeth ColorEye7000A according to ASTM D1925, at 1.0 mm or 2.5 mm thickness as specified in the examples.

Tensile stress and tensile modulus were measured in accordance with ISO 527 with speed of 50 mm/min.

Flexural stress and flexural modulus were measured in accordance with ISO 178.

ASTM Izod notched impact energy was as measured at 23° C. according to ASTM D256 using a 80 mm×10 mm×4 mm specimen.

ISO notched Izod impact was measured at 23° C. according to ISO 180/1A using a multipurpose test specimen in accordance with ISO 3167 TYPE.

A Vicat B120 softening temperature was measured according to ISO 306.

Heat deflection temperature (HDT) was measured flat on a 80 mm×10 mm×4 mm bar with a 64 mm span at 0.45 MPa according to ISO 75/Bf.

Melt volume flow rate (MVR) was measured at 330° C./2.16 Kg at 300 second dwell according to ISO 1133.

Transmission at 400 nm, 550 nm, 940 nm, or 1310 nm was measured with Perkin Elmer 950 spectrometer equipped with 15 cm integrated sphere on a molded plaque with a thickness of 1 mm, 2 mm, or 3 mm.

Haze was measured according to ASTM D1003-00 on a molded plaque with thickness between 1 and 3 mm.

Refractive index was measured according to ISO 489 on a molded plaque with a thickness of 1 mm.

Abbe number was measured according to ISO 489 on a molded plaque with a thickness of 1 mm.

Flammability tests were performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as HB, UL94 V0, V1, V2, VA, and/or VB.

BPA Purity Determination

The BPA purity was determined on the compositions and/or on the polycarbonate or copolycarbonate.

About 200 milligrams (mg) of the sample was weighed. It was dissolved in 5 ml of tetrahydrofuran (THF) and 2 ml of a 10% solution of potassium hydroxide diluted in methanol. The depolymerization of polycarbonate was carried out with the use of these solvents.

The solution was shaken for 2 hours. Then, 2 milliliters (ml) of acetic acid was added to protonate the BPA carbonate salts and decrease the pH. The solution was shaken again for half an hour for homogenization and dissolution of all precipitates.

The device used for the HPLC analysis was an Agilent 1100 system. The software used was Agilent ChemStation. The analysis was carried out on a C18 column. A gradient of polar solvents was used. It was a mixture of water and methanol. THF was used at the end of the analysis to clean the column.

The impurities concentration in the depolymerized composition is determined by HPLC. Then, the BPA purity can be deduced via the equation:

wt % of BPA purity=100%−wt % of impurities in depolymerized composition*254/228.

Examples 1 and Comparative Example 2

Example 1 and comparative example 2 demonstrate the effect of using bisphenol A homopolycarbonate made from a high purity BPA on color stability when blended with PPPBP-BPA copolycarbonate and molded under aggressive molding conditions. Formulations and results are shown in Table 2.

TABLE 2

| Component | Unit | Ex 1 | CEx 2 |
| --- | --- | --- | --- |
| CPC-1 | Wt % | 63.70 | 63.70 |
| PC-1B | Wt % | 11.30 | |
| PC-1A | Wt % | | 11.30 |
| PC-2B | Wt % | 23.95 | |
| PC-2A | Wt % | | 23.95 |
| PETS | Wt % | 0.30 | 0.30 |
| AO-1 | Wt % | 0.08 | 0.08 |
| AO-2 | Wt % | 0.04 | 0.04 |
| UVA 234 | Wt % | 0.30 | 0.30 |
| Tosylate premix | Wt % | 0.33 | 0.33 |
| Total | Wt % | 100 | 100 |
| Tosylate | ppm | 4 | 4 |
| BPA purity | % | 99.5 | 99.4 |
| Property | | | |
| YI after molding at 310° C./5 min | | 2.79 | 2.97 |
| YI after molding at 335° C./10 min | | 3.72 | 4.04 |

TABLE 2-continued

| Component | Unit | Ex 1 | CEx 2 |
| --- | --- | --- | --- |
| YI after molding at 355° C./5 min | | 3.45 | 4.06 |
| YI after molding at 355° C./10 min | | 4.21 | 6.87 |
| YI after molding at 355° C./15 min | | 5.03 | 10.26 |

The data in Table 2 indicates that the use of bisphenol A homopolycarbonate derived from a high purity BPA (Ex1) provides improved color stability as compared to a composition containing a bisphenol A homopolycarbonate derived from a lower purity BPA (CEx2) when samples are molded at a standard temperature (310° C.) as well as at aggressive temperatures (335° C. and 355° C.). The difference is more pronounced at high temperatures, where the color improvement is almost 50% (355° C./15) and 39% at 355/10 min Examples 3-10

Examples 3-10 demonstrate that effect of using PPPBP-BPA copolycarbonate derived from a high purity BPA on color stability under various molding conditions. Formulations and results are shown in Table 3.

TABLE 3

| Component (wt %) | Ex 3 | CEx 4 | Ex 5 | CEx 6 | Ex 7 | CEx 8 | Ex 9 | CEx 10 |
| --- | --- | --- | --- | --- | --- | --- | --- | --- |
| CPC-1 | | 99.59 | | 98.58 | | 98.25 | | 99.47 |
| CPC-2 | 99.59 | | 98.58 | | 98.25 | | 99.47 | |
| PETS | 0.3 | 0.3 | 0.3 | 0.3 | 0.3 | 0.3 | 0.3 | 0.3 |
| AO-1 | 0.08 | 0.08 | 0.08 | 0.08 | 0.08 | 0.08 | 0.08 | 0.08 |
| AO-2 | 0.04 | 0.04 | 0.04 | 0.04 | 0.04 | 0.04 | 0.04 | 0.04 |
| $H_3PO_3$ premix | | | | | | | 0.11 | 0.11 |
| Tosylate premix-1 | | | 1.00 | 1.00 | | | | |
| Tosylate premix-2 | | | | | 1.33 | 1.33 | | |
| Total | 100 | 100 | 100 | 100 | 100 | 100 | 100 | 100 |
| Tosylate content (ppm) | 0 | 0 | 6 | 6 | 8 | 8 | 0 | 0 |
| $H_3PO_3$ content (ppm) | 0 | 0 | 0 | 0 | 0 | 0 | 3 | 3 |
| BPA purity | 99.7 | 99.4 | 99.7 | 99.4 | 99.7 | 99.4 | 99.7 | 99.4 |
| YI after molding* | | | | | | | | |
| at 330° C./5 min | 2.9 | 3.72 | 2.9 | 2.84 | 2.8 | 2.82 | 3.4 | 3.55 |
| at 355° C./10 min | 24.9 | 35.59 | 7.6 | 15.71 | 6.5 | 9.25 | 21.1 | 26.74 |
| YI improvement vs CEx at 355° C./10 min | −30 | | −52 | | −30 | | −21 | |

The results in Table 3 indicate that the use of a PPPBP-BPA copolycarbonate based on a high purity BPA improves color under all molding conditions, compared to the same composition based on less pure BPA (Ex 3 versus CEx4, Ex5 versus CEx6, and so on). The use of an acid stabilizer (butyl tosylate or H3P03) can further improve the color stability of the composition (for example, Ex5 versus Ex3).

Comparative Example 11 and Example 12

Comparative example 11 and Example 12 demonstrate the effect of using BPA homopolycarbonate derived from high purity BPA on color stability after heat aging. Formulations and results are shown in Table 5.

TABLE 5

| Component | Unit | CEx 11 | Ex 12 |
| --- | --- | --- | --- |
| CPC-1 | Wt % | 63.7 | 63.7 |
| PC-1A | Wt % | 18.1 | |
| PC-2A | Wt % | 17.8 | |
| PC-1B | Wt % | | 18.1 |

TABLE 5-continued

| Component | Unit | CEx 11 | Ex 12 |
|---|---|---|---|
| PC-2B | Wt % | | 17.8 |
| AO-1 | Wt % | 0.08 | 0.08 |
| PETS | Wt % | 0.3 | 0.3 |
| AO-2 | Wt % | 0.04 | 0.04 |
| Total | Wt % | 100.00 | 100.00 |
| BPA purity | % | 99.5 | 99.6 |
| Property | | | |
| Heat aging at 140° C.; ΔYI t = 0* | | 0 | 0 |
| Heat aging at 140° C.; ΔYI t = 2658 hrs | | 11.5 | 8.3 |
| Heat aging at 140° C.; ΔYI t = 5182 hrs | | 30.3 | 22.8 |

*Thickness of 2.5 mm

The results in Table 5 indicate that color shifting after heat aging is significantly improved when using bisphenol A homopolycarbonate derived from a high purity BPA. Comparing Ex 12 with CEx 11, delta YI is decreased from 11.5 to 8.3 after 2658 hours of aging at 140° C. and the delta YI is decreased from 30.3 to 22.8 after 5000 hours of aging at 140° C.

Examples 13-26

Examples 13-26 demonstrate the effect of using a blend of BPA homopolycarbonate and PPPBP-BPA copolycarbonate, both derived from a high purity, on color stability after heat aging. Formulations and results are shown in Table 6.

The data indicates that blends containing bisphenol A homopolycarbonate and PPPBP-BPA copolycarbonate have excellent color stability after heat aging when both the bisphenol A homopolycarbonate and PPPBP-BPA copolycarbonate are derived from a high purity BPA. The use of a small amount of an acid stabilizer (butyl tosylate or $H_3PO_3$ or a combination thereof) can further improve the color stability of the blends after standard or abusive molding.

Examples 27-30

Examples 27-30 compare the heat aging performance of compositions containing a standard or high purity PPPBP-BPA copolycarbonate and a standard or high purity bisphenol A homopolycarbonate, and an ultraviolet light stabilizer, with or without the presence of an acid stabilizer. Formulations and results are shown in Table 7.

The data indicates that blends containing high purity bisphenol A homopolycarbonate and high purity PPPBP-BPA copolycarbonate (99.7% purity for total composition) have better color stability after heat aging as compared to blends containing standard purity bisphenol A homopolycarbonate and standard purity PPPBP-BAP copolycarbonate (99.4% purity for total composition).

TABLE 6

| Component (wt %) | Ex 13 | Ex 14 | Ex 15 | Ex 16 | Ex 17 | Ex 18 | Ex 19 | Ex 20 | Ex 21 | Ex 22 | Ex 23 | Ex 24 | Ex 25 | Ex 26 |
|---|---|---|---|---|---|---|---|---|---|---|---|---|---|---|
| CPC-2 | 63.7 | 63.7 | 63.7 | 63.7 | 63.7 | 63.7 | 63.7 | 63.7 | 63.7 | 63.7 | 63.7 | 63.7 | 63.7 | 63.7 |
| PC-1B | | | | | 35.58 | 35.48 | 35.38 | 35.42 | 35.37 | 35.47 | | | | |
| PC-2B | 35.58 | 35.58 | 35.42 | 35.37 | | | | | | | | | | |
| PC3 | | | | | | | | | | | 35.58 | 35.48 | 35.42 | 35.37 |
| PETS | 0.3 | 0.3 | 0.3 | 0.3 | 0.3 | 0.3 | 0.3 | 0.3 | 0.3 | 0.3 | 0.3 | 0.3 | 0.3 | 0.3 |
| AO-1 | 0.08 | 0.08 | 0.08 | 0.08 | 0.08 | 0.08 | 0.08 | 0.08 | 0.08 | 0.08 | 0.08 | 0.08 | 0.08 | 0.08 |
| AO-2 | 0.04 | 0.04 | 0.04 | 0.04 | 0.04 | 0.04 | 0.04 | 0.04 | 0.04 | 0.04 | 0.04 | 0.04 | 0.04 | 0.04 |
| UVA 234 | 0.3 | 0.3 | 0.3 | 0.3 | 0.3 | 0.3 | 0.3 | 0.3 | 0.3 | 0.3 | 0.3 | 0.3 | 0.3 | 0.3 |
| $H_3PO_3$ premix | | | 0.055 | 0.11 | | | | 0.055 | 0.11 | 0.11 | | | 0.055 | 0.11 |
| Tosylate premix-2 | | 0.10 | 0.10 | 0.10 | | 0.10 | 0.20 | 0.10 | 0.10 | | | 0.10 | 0.10 | 0.10 |
| Total | 100 | 100 | 100 | 100 | 100 | 100 | 100 | 100 | 100 | 100 | 100 | 100 | 100 | 100 |
| Property | | | | | | | | | | | | | | |
| YI after molding* | | | | | | | | | | | | | | |
| at 310° C./5 min | 2.1 | 1.7 | 1.8 | 1.7 | 2.3 | 1.8 | 1.8 | 1.7 | 1.8 | 1.8 | 2.2 | 1.8 | 1.8 | 1.7 |
| at 330° C./10 min | 3.7 | 2.0 | 2.0 | 2.0 | 4.7 | 2.1 | 1.9 | 2.0 | 1.9 | 2.3 | 3.8 | 2.0 | 1.9 | 1.9 |
| YI after heat aging* | | | | | | | | | | | | | | |
| 140° C./0 h | 2.1 | 1.7 | 1.8 | 1.7 | 2.3 | 1.8 | 1.8 | 1.7 | 1.8 | 1.8 | 2.2 | 1.8 | 1.8 | 1.7 |
| 140° C./200 h | 2.4 | 2.1 | 2.2 | 2.2 | 2.4 | 2.1 | 2.2 | 2.2 | 2.2 | 2.1 | 2.1 | 2.2 | 2.2 | 2.2 |
| 140° C./550 h | 2.9 | 2.4 | 2.6 | 2.6 | 2.6 | 2.5 | 2.6 | 2.6 | 2.6 | 2.5 | 2.3 | 2.5 | 2.7 | 2.7 |
| 140° C./1000 h | 3.9 | 3.0 | 3.2 | 3.4 | 3.0 | 3.1 | 3.2 | 3.2 | 3.2 | 3.0 | 2.7 | 3.1 | 3.4 | 3.4 |
| 140° C./1500 h | 5.3 | 3.8 | 4.1 | 4.4 | 3.5 | 3.9 | 4.1 | 4.0 | 4.0 | 3.8 | 3.2 | 3.9 | 4.2 | 4.2 |
| Delta YI after heat ageing at 140° C. compared to 0 hrs | | | | | | | | | | | | | | |
| 140° C./200 h | 0.3 | 0.4 | 0.4 | 0.5 | 0.1 | 0.3 | 0.4 | 0.5 | 0.4 | 0.3 | -0.1 | 0.4 | 0.4 | 0.5 |
| 140° C./550 h | 0.8 | 0.7 | 0.8 | 0.9 | 0.3 | 0.7 | 0.8 | 0.9 | 0.8 | 0.7 | 0.1 | 0.7 | 0.9 | 1 |
| 140° C./1000 h | 1.8 | 1.3 | 1.4 | 1.7 | 0.7 | 1.3 | 1.4 | 1.5 | 1.4 | 1.2 | 0.5 | 1.3 | 1.6 | 1.7 |
| 140° C./1500 h | 3.2 | 2.1 | 2.3 | 2.7 | 1.2 | 2.1 | 2.3 | 2.3 | 2.2 | 2 | 1 | 2.1 | 2.4 | 2.5 |
| 155° C./0 h | 2.1 | 1.7 | 1.8 | 1.7 | 2.3 | 1.8 | 1.8 | 1.7 | 1.8 | 1.8 | 2.2 | 1.8 | 1.8 | 1.7 |
| 155° C./150 h | 2.7 | 2.2 | 2.4 | 2.4 | 2.4 | 2.3 | 2.3 | 2.3 | 2.4 | 2.3 | 2.3 | 2.4 | 2.4 | 2.3 |
| 155° C./300 h | 3.6 | 2.8 | 2.9 | 3.1 | 2.7 | 3.0 | 3.0 | 3.0 | 3.1 | 2.9 | 2.7 | 3.1 | 3.1 | 3.0 |
| 155° C./550 h | 5.5 | 3.8 | 4.0 | 4.4 | 3.4 | 4.1 | 4.3 | 4.2 | 4.4 | 4.1 | 3.4 | 4.3 | 4.4 | 4.3 |
| 155° C./1000 h | 10.3 | 6.0 | 6.4 | 7.7 | 5.3 | 6.7 | 7.1 | 7.0 | 7.4 | 6.9 | 5.4 | 7.1 | 7.7 | 7.6 |
| 155° C./1500 h | 16.6 | 9.3 | 10.1 | 12.5 | 8.6 | 10.4 | 11.3 | 11.3 | 12.0 | 11.2 | 9.1 | 11.4 | 13.0 | 13.0 |
| Delta YI after heat ageing at 155° C. compared to 0 hrs | | | | | | | | | | | | | | |
| 155° C./150 h | 0.6 | 0.5 | 0.6 | 0.7 | 0.1 | 0.5 | 0.5 | 0.6 | 0.6 | 0.5 | 0.1 | 0.6 | 0.6 | 0.6 |
| 155° C./300 h | 1.5 | 1.1 | 1.1 | 1.4 | 0.4 | 1.2 | 1.2 | 1.3 | 1.3 | 1.1 | 0.5 | 1.3 | 1.3 | 1.3 |
| 155° C./550 h | 3.4 | 2.1 | 2.2 | 2.7 | 1.1 | 2.3 | 2.5 | 2.5 | 2.6 | 2.3 | 1.2 | 2.5 | 2.6 | 2.6 |

TABLE 6-continued

| Component (wt %) | Ex 13 | Ex 14 | Ex 15 | Ex 16 | Ex 17 | Ex 18 | Ex 19 | Ex 20 | Ex 21 | Ex 22 | Ex 23 | Ex 24 | Ex 25 | Ex 26 |
|---|---|---|---|---|---|---|---|---|---|---|---|---|---|---|
| 155° C./1000 h | 8.2 | 4.3 | 4.6 | 6 | 3 | 4.9 | 5.3 | 5.3 | 5.6 | 5.1 | 3.2 | 5.3 | 5.9 | 5.9 |
| 155° C./1500 h | 14.5 | 7.6 | 8.3 | 10.8 | 6.3 | 8.6 | 9.5 | 9.6 | 10.2 | 9.4 | 6.9 | 9.6 | 11.2 | 11.3 |

*All the samples tested have a thickness of 1 mm.

TABLE 7

| Component (wt %) | CEx 27 | Ex 28 | CEx 29 | Ex 30 |
|---|---|---|---|---|
| CPC-1 | 63.7 | | 63.7 | |
| CPC-2 | | 63.7 | | 63.7 |
| PC-1A | 24.6 | | 23.0 | |
| PC-1B | | 24.6 | | 23.0 |
| PC-2A | 11.3 | | 11.3 | |
| PC-2B | | 11.3 | | 11.3 |
| PETS | 0.3 | 0.3 | 0.3 | 0.3 |
| AO-1 | 0.08 | 0.08 | 0.08 | 0.08 |
| AO-2 | 0.04 | 0.04 | 0.04 | 0.04 |
| UVA 234 | 0.3 | 0.3 | 0.3 | 0.3 |
| Tosylate premix-1 | 0 | 0 | 1.33 | 1.33 |
| Total | 100 | 100 | 100 | 100 |
| Tosylate content (ppm) | 0 | 0 | 8 | 8 |
| BPA Purity | 99.4 | 99.7 | 99.4 | 99.7 |
| Property | | | | |
| YI after heat aging* | | | | |
| 140° C./0 h | 3.1 | 3.3 | 3.0 | 3.2 |
| 140° C./500 h | 4.2 | 3.9 | 5.0 | 4.8 |
| 140° C./3000 h | 12.0 | 8.2 | 19.1 | 14.5 |
| 140° C./4000 h | 13.3 | 8.9 | 21.3 | 16.1 |
| Delta YI after heat ageing at 140° C. compared to 0 hrs | | | | |
| 140° C./500 h | 1.1 | 0.6 | 2 | 1.6 |
| 140° C./3000 h | 8.9 | 4.9 | 16.1 | 11.3 |
| 140° C./4000 h | 10.2 | 5.6 | 18.3 | 12.9 |
| 155° C./0 h | 3.1 | 3.3 | 3.0 | 3.1 |
| 155° C./100 h | 3.7 | 3.4 | 4.0 | 4.1 |
| 155° C./250 h | 4.7 | 4.0 | 5.8 | 5.4 |
| 155° C./500 h | 7.3 | 5.1 | 10.1 | 8.2 |
| 155° C./750 h | 10.2 | 6.4 | 15.1 | 11.0 |
| 155° C./1500 h | 22.6 | 12.4 | 35.0 | 25.3 |
| 155° C./2000 h | 30.7 | 17.6 | 46.6 | 35.4 |
| Delta YI after heat ageing at 155° C. compared to 0 hrs | | | | |
| 155° C./100 h | 0.6 | 0.1 | 1 | 1 |
| 155° C./250 h | 1.6 | 0.7 | 2.8 | 2.3 |
| 155° C./500 h | 4.2 | 1.8 | 7.1 | 5.1 |
| 155° C./750 h | 7.1 | 3.1 | 12.1 | 7.9 |
| 155° C./1500 h | 19.5 | 9.1 | 32 | 22.2 |
| 155° C./2000 h | 27.6 | 14.3 | 43.6 | 32.3 |

*All the samples tested have a thickness of 2.5 mm.

TABLE 8

| Component (wt %) | Ex 31 | Ex 32 | Ex 33 | Ex 34 | Ex 35 | Ex 36 | Ex 37 | Ex 38 | Ex 39 | Ex 40 | CEx 41 | CEx 42 |
|---|---|---|---|---|---|---|---|---|---|---|---|---|
| CPC-2 | 99.28 | 99.21 | 99.18 | 99.16 | 99.15 | 99.09 | 99.08 | 99.01 | 99.22 | 99.17 | | |
| PETS | 0.3 | 0.3 | 0.3 | 0.3 | 0.3 | 0.3 | 0.3 | 0.3 | 0.3 | 0.3 | | |
| AO-1 | 0.08 | 0.08 | 0.08 | 0.08 | 0.08 | 0.08 | 0.08 | 0.08 | 0.08 | 0.08 | | |
| AO-2 | 0.03 | 0.03 | 0.03 | 0.03 | 0.03 | 0.03 | 0.03 | 0.03 | 0.03 | 0.03 | | |
| UVA 234 | 0.3 | 0.3 | 0.3 | 0.3 | 0.3 | 0.3 | 0.3 | 0.3 | 0.3 | 0.3 | | |
| $H_3PO_3$ premix | | | 0.028 | 0.055 | | 0.055 | | | 0.055 | 0.11 | | |
| Tosylate premix-2 | 0.668 | 0.067 | 0.067 | 0.134 | 0.134 | 0.200 | 0.267 | | | | | |
| Total | 100 | 100 | 100 | 100 | 100 | 100 | 100 | 100 | 100 | 100 | | |
| Property | | | | | | | | | | | | |
| YI after molding* | | | | | | | | | | | | |
| at 330° C./5 min | 4.89 | 2.79 | 2.42 | 2.38 | 2.54 | 2.17 | 2.36 | 2.34 | 2.83 | 2.55 | 0.75 | 8.69 |
| at 355° C./10 min | 14.80 | 10.67 | 11.83 | 7.84 | 7.11 | 5.35 | 5.78 | 7.10 | 12.44 | 10.92 | 0.83 | |
| at 365° C./5 min | | | | | | | | | | | 0.87 | 7.11 |
| at 375° C./5 min | | | | | | | | | | | | 1.12 |
| YI after heat aging* | | | | | | | | | | | | |
| 140° C./0 h | 4.20 | 2.79 | 2.42 | 2.38 | 2.54 | 2.17 | 2.36 | 2.34 | 2.83 | 2.55 | 0.70 | 10.20 |
| 140° C./200 h | 4.24 | 3.10 | 2.82 | 2.85 | 3.09 | 2.72 | 2.85 | 3.03 | 3.25 | 2.92 | | |
| 140° C./250 h | | | | | | | | | | | 1.60 | 14.33 |
| 140° C./550 h | 4.54 | 3.39 | 3.17 | 3.26 | 3.53 | 3.21 | 3.32 | 3.58 | 3.55 | 3.25 | 2.44 | 17.45 |
| 140° C./1000 h | 4.99 | 3.89 | 3.72 | 3.93 | 4.25 | 4.02 | 4.13 | 4.39 | 4.09 | 3.80 | 4.54 | 24.11 |
| 140° C./1500 h | 5.71 | 4.63 | 4.50 | 4.85 | 5.26 | 5.10 | 5.19 | 5.50 | 4.88 | 4.62 | | |
| Delta YI after heat ageing at 140° C. compared to 0 hrs | | | | | | | | | | | | |
| 140° C./200 h | 0.04 | 0.31 | 0.4 | 0.47 | 0.55 | 0.55 | 0.49 | 0.69 | 0.42 | 0.37 | | |
| 140° C./250 h | | | | | | | | | | | 0.9 | 4.13 |
| 140° C./550 h | 0.34 | 0.6 | 0.75 | 0.88 | 0.99 | 1.04 | 0.96 | 1.24 | 0.72 | 0.7 | 1.74 | 7.25 |
| 140° C./1000 h | 0.79 | 1.1 | 1.3 | 1.55 | 1.71 | 1.85 | 1.77 | 2.05 | 1.26 | 1.25 | 3.84 | 13.91 |
| 140° C./1500 h | 1.51 | 1.84 | 2.08 | 2.47 | 2.72 | 2.93 | 2.83 | 3.16 | 2.05 | 2.07 | | |
| 155° C./0 h | 4.19 | 2.79 | 2.42 | 2.38 | 2.54 | 2.17 | 2.36 | 2.34 | 2.83 | 2.55 | 0.70 | 10.20 |
| 155° C./100 h | | | | | | | | | | | 1.85 | 16.14 |
| 155° C./150 h | 4.68 | 3.21 | 2.89 | 2.98 | 3.31 | 2.97 | 3.19 | 3.16 | 3.49 | 3.11 | | |
| 155° C./250 h | | | | | | | | | | | 3.29 | 21.71 |
| 155° C./300 h | 5.04 | 3.57 | 3.30 | 3.54 | 3.90 | 3.61 | 3.74 | 3.86 | 3.88 | 3.59 | | |

TABLE 8-continued

| Component (wt %) | Ex 31 | Ex 32 | Ex 33 | Ex 34 | Ex 35 | Ex 36 | Ex 37 | Ex 38 | Ex 39 | Ex 40 | CEx 41 | CEx 42 |
|---|---|---|---|---|---|---|---|---|---|---|---|---|
| 155° C./500 h   |       |       |       |       |       |       |       |       |       |       | 6.02  | 30.09 |
| 155° C./550 h   | 5.81  | 4.30  | 4.03  | 4.42  | 4.86  | 4.70  | 4.82  | 5.04  | 4.65  | 4.40  |       |       |
| 155° C./1000 h  | 7.75  | 6.09  | 5.89  | 6.49  | 7.10  | 7.02  | 7.12  | 7.64  | 6.65  | 6.45  | 14.31 | 44.84 |
| 155° C./1500 h  | 10.76 | 8.93  | 8.87  | 9.60  | 10.22 | 10.38 | 10.39 | 11.32 | 9.64  | 9.60  |       |       |
| 155° C./2000 h  |       |       |       |       |       |       |       |       |       |       | 35.11 | 66.55 |
| Delta YI after heat ageing at 155° C. compared to 0 hrs ||||||||||||||
| 155° C./100 h   |       |       |       |       |       |       |       |       |       |       | 1.15  | 5.94  |
| 155° C./150 h   | 0.49  | 0.42  | 0.47  | 0.6   | 0.77  | 0.8   | 0.83  | 0.82  | 0.66  | 0.56  |       |       |
| 155° C./250 h   |       |       |       |       |       |       |       |       |       |       | 2.59  | 11.51 |
| 155° C./300 h   | 0.85  | 0.78  | 0.88  | 1.16  | 1.36  | 1.44  | 1.38  | 1.52  | 1.05  | 1.04  |       |       |
| 155° C./500 h   |       |       |       |       |       |       |       |       |       |       | 5.32  | 19.89 |
| 155° C./550 h   | 1.62  | 1.51  | 1.61  | 2.04  | 2.32  | 2.53  | 2.46  | 2.7   | 1.82  | 1.85  |       |       |
| 155° C./1000 h  | 3.56  | 3.3   | 3.47  | 4.11  | 4.56  | 4.85  | 4.76  | 5.3   | 3.82  | 3.9   | 13.61 | 34.64 |
| 155° C./1500 h  | 6.57  | 6.14  | 6.45  | 7.22  | 7.68  | 8.21  | 8.03  | 8.98  | 6.81  | 7.05  |       |       |
| 155° C./2000 h  |       |       |       |       |       |       |       |       |       |       | 34.41 | 56.35 |

*All the samples tested have a thickness of 1 mm.

Examples 31-42

Examples 31-42 illustrate the heat aging performance of compositions containing a PPPBP-BPA copolycarbonate derived from a high purity BPA with or without the presence of an acid stabilizer. Formulations and results are shown in Table 8. CEx 41 is commercial product APEC 2097, and CEx 42 is a known formulation U-100.

The data indicates that high purity PPPBP-BPA copolycarbonate has better color stability after heat aging as compared to other known high heat compositions. The presence of a small amount of an acid stabilizer (butyl tosylate, $H_3PO_3$, or a combination thereof) can further improve the heat aging performance of high purity PPPBP-BPA copolycarbonate.

Examples 43-47

Examples 43-47 compare the heat aging performance of compositions containing a high purity PPPBP-BPA copolycarbonate or a standard purity PPPBP-BPA copolycarbonate with or without the presence of an acid stabilizer. Formulations and results are i Table 9.

TABLE 9

| Component (wt %) | CEx 43 | Ex 44 | CEx 45 | Ex 46 | CEx 47 |
|---|---|---|---|---|---|
| CPC-2 |         | 98.5801 |         | 99.47  |         |
| CPC-1 | 98.5801 |         | 99.47   |        | 99.58   |
| PETS  | 0.3     | 0.3     | 0.3     | 0.3    | 0.3     |
| AO-1  | 0.08    | 0.08    | 0.08    | 0.08   | 0.08    |
| AO-2  | 0.04    | 0.04    | 0.04    | 0.04   | 0.04    |

TABLE 9-continued

| Component (wt %) | CEx 43 | Ex 44 | CEx 45 | Ex 46 | CEx 47 |
|---|---|---|---|---|---|
| $H_3PO_3$ premix |       |        |        | 0.11  | 0.11   |
| Tosylate premix-1 |      | 0.9999 |        | 0.9999 |       |
| Total | 100 | 100 | 100 | 100 | 100 |
| Property |||||||
| YI after heat aging* |||||||
| 155° C./0 h    | 2.8  | 2.9  | 3.5  | 3.4 | 3.7  |
| 155° C./250 h  | 5.6  | 5.1  | 6.5  | 4.6 | 6.1  |
| 155° C./500 h  | 8.2  | 7.1  | 19.6 | 5.8 | 8.7  |
| 155° C./1000 h | 14.2 | 11.4 | 21.1 | 8.5 | 15.3 |
| Delta YI after heat ageing at 155° C. compared to 0 hrs ||||||
| 155° C./250 h  | 2.8  | 2.2  | 3    | 1.2 | 2.4  |
| 155° C./500 h  | 5.4  | 4.2  | 16.1 | 2.4 | 5    |
| 155° C./1000 h | 11.4 | 8.5  | 17.6 | 5.1 | 11.6 |

*The samples tested had a thickness of 2.5 mm and were molded at 330° C. at residence time of five minutes.

The data indicates that high purity PPPBP-BPA copolycarbonate has better color stability after heat aging as compared to standard purity PPPBP-BPA copolycarbonate. The data also shows that the presence of an acid stabilizer (butyl tosylate or H3P03) does not improve the heat aging performance of standard purity PPPBP-BPA copolycarbonate.

Examples 48-53

Examples 48-53 illustrates various properties of compositions containing high purity PPPBP-BPA, butyl tosylate, and optionally a high purity BPA homopolycarbonate. Formulations and results are shown in Table 10. About 0.0002 wt % of a dye package was also present.

TABLE 10

| Component | Unit | Ex 48 | Ex 49 | Ex 50 | Ex 51 | Ex 52 | Ex 53 |
|---|---|---|---|---|---|---|---|
| CPC-2 | wt % | 63.7  | 63.7  | 63.7  | 99.31 | 99.01 | 98.83 |
| PC-1A | wt % | 28.68 | 28.38 | 23.9  | 0     | 0     | 0     |
| PC-2A | wt % | 7     | 7     | 11.3  | 0     | 0     | 0     |
| Tosylate premix-2 | wt % | 0.2 | 0.2 | 0.2 | 0.27 | 0.27 | 0.27 |
| AO-1  | wt % | 0.08  | 0.08  | 0.08  | 0.08  | 0.08  | 0.08  |
| AO-2  | wt % | 0.04  | 0.04  | 0.04  | 0.04  | 0.04  | 0.04  |
| PETS  | wt % | 0.3   | 0.3   | 0.3   | 0.3   | 0.3   | 0.3   |
| UVA234 | wt % | 0    | 0.3   | 0.3   | 0     | 0.3   | 0.3   |
| Rimar salt | wt % | 0 | 0    | 0.08  | 0     | 0     | 0.08  |
| Octaphenylcyclotetrasiloxane | wt % | 0 | 0 | 0.1 | 0 | 0 | 0.1 |

TABLE 10-continued

| Component | Unit | Ex 48 | Ex 49 | Ex 50 | Ex 51 | Ex 52 | Ex 53 |
|---|---|---|---|---|---|---|---|
| Tensile Modulus, 1 mm/min | MPa | 2488 | 2511 | 2522 | 2550 | 2589 | 2571 |
| Tensile Stress, yield, 50 mm/min | MPa | 76 | 77 | 77 | 82 | 83 | 82 |
| Tensile Stress, break, 50 mm/min | MPa | 64 | 69 | 67 | 65 | 65 | 65 |
| Tensile Strain, yield, 50 mm/min | % | 6.4 | 6.9 | 6.9 | 7.3 | 7.3 | 7.2 |
| Tensile Strain, break, 50 mm/min | % | 60 | 84 | 78 | 40 | 30 | 27 |
| Flexural Modulus, 2 mm/min | MPa | 2524 | 2518 | 2526 | 2547 | 2634 | 2574 |
| Flexural Stress, yield, 2 min/min | MPa | 116 | 117 | 114 | 123 | 125 | 124 |
| Izod Impact, notched, +23° C. | J/m | 89 | 83 | 80 | 74 | 72 | 76 |
| Izod Impact, notched, −30° C, | J/m | NA | 79 | 78 | 73 | 68 | 74 |
| Izod Impact, notched* +23° C. | kJ/m$^2$ | 8 | 8 | 8 | 8 | 7 | 7 |
| Izod Impact, notched* −30° C. | kJ/m$^2$ | NA | 6 | 7 | 6 | 6 | 7 |
| Vicat Softening Temp, B/120 | ° C. | 173.1 | 171.7 | 171.6 | 192.9 | 191.0 | 189.7 |
| HDT | ° C. | 164.7 | 165.5 | 165.4 | 186.0 | 185.0 | 184.4 |
| MVR at 330° C./2.16 kg, 300 s | cm$^3$/10 min | 29.51 | 30.77 | 33.27 | 14.1 | 15.0 | 16.7 |
| Transmission at 400 nm, 1 mm | % | 86.5 | | | 85.5 | 71.4 | 82.9 |
| Transmission at 400 nm, 2 mm | % | 84.8 | | | 82.4 | 58.7 | 78.2 |
| Transmission at 400 nm, 3 mm | % | 82.8 | | | 79.6 | 48.5 | 73.6 |
| Transmission at 550 nm, 1 mm | % | 88.1 | | | 88.1 | 87.2 | 87.8 |
| Transmission at 550 nm, 2 mm | % | 86.8 | | | 86.7 | 85.2 | 86.5 |
| Transmission at 550 nm, 3 mm | % | 85.5 | | | 85.3 | 83.1 | 85.0 |
| Transmission at 940 nm, 1 mm | % | 90.3 | | | 90.1 | 90.1 | 90.0 |
| Transmission at 940 nm, 2 mm | % | 90.2 | | | 90.0 | 89.9 | 89.9 |
| Transmission at 940 nm, 3 mm | % | 89.9 | | | 89.8 | 89.8 | 89.6 |
| Transmission at 1310 nm, 1 mm | % | 90.0 | | | 89.8 | 89.8 | 89.8 |
| Transmission at 1310 nm, 2 mm | % | 89.3 | | | 89.2 | 89.1 | 89.1 |
| Transmission at 1310 nm, 3 mm | % | 88.6 | | | 88.5 | 88.5 | 88.4 |
| Total transmission, 1 mm | % | 89.5 | 89.0 | 90.0 | 89.5 | 88.7 | 89.3 |
| Total transmission, 2 mm | % | 88.4 | 88.7 | 88.9 | 88.1 | 86.6 | 88.0 |
| Total transmission, 3 mm | % | 87.1 | 7.4 | 87.8 | 86.8 | 84.7 | 86.7 |
| Haze, 1 mm | % | 0.4 | 0.3 | 0.3 | 0.4 | 0.4 | 0.3 |
| Haze, 2 mm | % | 0.7 | 0.3 | 0.3 | 0.6 | 0.6 | 0.4 |
| Haze, 3 mm | % | 0.9 | 0.4 | 0.4 | 0.8 | 0.8 | 0.5 |
| Refractive index at 587.6 nm | — | | 1.602 | 1.602 | NA | 1.609 | 1.609 | NA |
| Refractive index at 940 nm | — | | 1.583 | 1.583 | NA | 1.589 | 1.589 | NA |
| Refractive index at 1310 nm | — | | 1.577 | 1.577 | NA | 1.583 | 1.583 | NA |
| Abbe number | — | | 30 | 30 | NA | 29 | 29 | NA |
| UL94 rating at 2.5 mm | — | NA | NA | V0 | NA | NA | V0 |
| UL94 rating at 2.0 mm | — | NA | NA | V2 | NA | NA | V2 |
| UL94 rating at 1.5 mm | — | NA | NA | V2 | NA | NA | V2 |
| UL94 rating at 0.8 mm | — | NA | NA | V2 | NA | NA | V2 |

Set forth below are various embodiments of the disclosure.

Embodiment 1

A thermoplastic composition comprising: a copolycarbonate comprising bisphenol A carbonate units and second carbonate units of the formula (1) wherein $R^a$ and $R^b$ are each independently a $C_{1-12}$ alkyl, $C_{1-12}$ alkenyl, $C_{3-8}$ cycloalkyl, or $C_{1-12}$ alkoxy, each $R^3$ is independently a $C_{1-6}$ alkyl, $R^4$ is hydrogen, $C_{2-6}$ alkyl or phenyl optionally substituted with 1 to 5 $C_{1-6}$ alkyl groups, p, q, and j are each independently 0 to 4; and optionally, a bisphenol A homopolycarbonate; wherein the second carbonate units are present in an amount of 10 to 49 mol %, preferably 13 to 40 mol % or 35 to 49 mol %, more preferably 18 to 35 mol % based on the sum of the moles of the copolycarbonate and the bisphenol A homopolycarbonate, the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, and the thermoplastic composition has a bisphenol A purity of at least 99.6%, or at least 99.7% as determined by high performance liquid chromatography; and wherein the thermoplastic composition has: a Vicat B120 of 155° C. or higher, preferably 165° C. or higher, more preferably 180° C. or higher as measured according to ISO 306; and an increase in yellowness index of less than 10, or of less than 7 during 1000 hours of heat aging at 155° C., as measured by ASTM D1925 on a 1 mm thick molded plaque.

Embodiment 2

A thermoplastic composition comprising: a copolycarbonate comprising bisphenol A carbonate units and second carbonate units of the formula (1) wherein $R^a$ and $R^b$ are each independently a $C_{1-12}$ alkyl, $C_{1-12}$ alkenyl, $C_{3-8}$ cycloalkyl, or $C_{1-12}$ alkoxy, each $R^3$ is independently a $C_{1-6}$ alkyl, $R^4$ is hydrogen, $C_{2-6}$ alkyl or phenyl optionally substituted with 1 to 5 $C_{1-6}$ alkyl groups, p, q, and j are each independently 0 to 4; and optionally, a bisphenol A homopolycarbonate; wherein the second carbonate units are present in an amount of 10 to 49 mol %, preferably 13 to 40 mol % or 35 to 49 mol %, more preferably 18 to 35 mol % based on the sum of the moles of the copolycarbonate and the bisphenol A homopolycarbonate, the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, and the thermoplastic composition has a bisphenol A purity of at least 99.6%, or at least 99.7% as determined by high performance liquid chromatography; and wherein the thermoplastic composition has: a Vicat B120 of 155° C. or higher, preferably 165° C. or higher, more preferably 180°

C. or higher as measured according to ISO 306; and a yellowness index which is at least 20% or at least 30% lower compared to the same composition having a Bisphenol A purity below 99.6% or below 99.5%, as measured by ASTM D1925 on a 2.5 mm thick molded plaque with a melt temperature of 355° C. and a residence time of 10 min.

Embodiment 3

The thermoplastic composition of Embodiment 2 having an increase in yellowness index of less than 15, or of less than 10 during 1000 hours of heat aging at 155° C., as measured by ASTM D1925 on a 1 mm thick molded plaque.

Embodiment 4

The thermoplastic composition of any one or more of Embodiments 1 to 3, wherein in the second carbonate units of the copolycarbonate, $R^a$ and $R^b$ are each independently a $C_{1-3}$ alkyl group, $R^3$ is each independently a $C_{1-6}$ alkyl group, $R^4$ is hydrogen, $C_{1-6}$ alkyl or phenyl optionally substituted with 1 to 5 $C_{1-6}$ alkyl groups, and p, q, and j are each independently 0 to 4.

Embodiment 5

The thermoplastic composition of any one or more of Embodiments 1 to 4, wherein the second carbonate repeating units in the copolycarbonate are of the formula (1a) wherein $R^5$ is hydrogen, phenyl or methyl, preferably phenyl.

Embodiment 6

The thermoplastic composition of any one or more of Embodiments 1 to 5, wherein the copolycarbonate comprises from 60 to 85 mol % of the bisphenol A carbonate units and 15 to 40 mol % of the second carbonate units, each based on the total number of carbonate units in the copolycarbonate.

Embodiment 7

The thermoplastic composition of any one or more of Embodiments 1 to 6, wherein the copolycarbonate comprises from 50 to 90 mol % of the bisphenol A carbonate units and 10 to 50 mol % of the second carbonate units, and has less than 15 mol % of the second carbonate units directly coupled to another second carbonate unit, each based on the total number of carbonate units in the copolycarbonate.

Embodiment 8

The thermoplastic composition of Embodiment 1 to 7, wherein the copolycarbonate further comprises at least 5 mole percent of a third carbonate unit different from the bisphenol A carbonate units and the second carbonate units, comprising units of the formula (3) to (7), or a combination thereof, wherein $R^c$ and $R^d$ are each independently a $C_{1-12}$ alkyl, $C_{1-12}$ alkenyl, $C_{3-8}$ cycloalkyl, or $C_{1-12}$ alkoxy, each $R^6$ is independently $C_{1-3}$ alkyl or phenyl, $X^a$ is a $C_{6-12}$ polycyclic aryl, $C_{3-18}$ mono- or polycycloalkylene, $C_{3-18}$ mono- or polycycloalkylidene, $-(Q^1)_x$-G-$(Q^2)_y$- group wherein $Q^1$ and $Q^2$ are each independently a $C_{1-3}$ alkylene, G is a $C_{3-10}$ cycloalkylene, x is 0 or 1, and y is 1, or —C($P^1$)($P^2$)— wherein $P^1$ is $C_{1-12}$ alkyl and $P^2$ is $C_{6-12}$ aryl, and m and n are each independently 0 to 4.

Embodiment 9

The thermoplastic composition of Embodiment 8, wherein the third carbonate units are of the formula (3a)-(3k), or a combination thereof, wherein W and $R^d$ are each independently a $C_{1-12}$ alkyl, $C_{1-12}$ alkenyl, $C_{3-8}$ cycloalkyl, or $C_{1-12}$ alkoxy, each $R^1$ is independently hydrogen or $C_{1-4}$ alkyl, each $R^2$ is independently $C_{1-4}$ alkyl or hydrogen, g is 0 to 10, and m and n are each independently 0 to 4.

Embodiment 10

The thermoplastic composition of Embodiment 8, wherein the third carbonate units are of the formula (3h), each $R^1$ is independently hydrogen or methyl, each $R^2$ is independently methyl or hydrogen, and g is 0 to 2.

Embodiment 11

The thermoplastic composition of any one or more of Embodiments 8 to 10, wherein the copolycarbonate comprises from 15 to 70 mol % of the bisphenol A carbonate units, 5 to 50 mol % of the second carbonate units, and 5 to 50 mol % of the third carbonate units, each based on the total number of carbonate units in the copolycarbonate.

Embodiment 12

The thermoplastic composition of any one or more of Embodiments 1 to 11, wherein the copolycarbonate has a hydroxyl end group content of less than 200 ppm and the optional bisphenol A homopolycarbonate has a hydroxyl end group content of less than 150 ppm.

Embodiment 13

The thermoplastic composition of any one or more of Embodiments 1 to 12, wherein the optional bisphenol A homopolycarbonate has a sulfur content of less than 2 ppm, or the copolycarbonate, the optional bisphenol A homopolycarbonate, or both are derived from a bisphenol A having a sulfur content of less than 2 ppm, each as measured by a Total Sulfur Analysis based on combustion and coulometric detection.

Embodiment 14

The thermoplastic composition of any one or more of Embodiments 1 to 13, wherein the thermoplastic composition comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography.

Embodiment 15

The thermoplastic composition of any one or more of Embodiments 1 to 14, wherein the copolycarbonate is present in an amount of 90 to 99.8 wt % based on the total weight of the thermoplastic composition.

Embodiment 16

The polycarbonate lens of any one or more of Embodiment 1 to 14, wherein the copolycarbonate is present in an amount of is 45 to 75 wt %, preferably 50 to 70 wt % and the bisphenol A homopolycarbonate is present in an amount of 25 to 55 wt %, preferably 30 to 50 wt %, each based on the total weight of the thermoplastic composition.

Embodiment 17

The thermoplastic composition of any one or more of Embodiments 1 to 16, further comprising 1 ppm to 40 ppm, preferably 4 ppm to 20 ppm or 6 ppm to 10 ppm of an acid stabilizer, the acid stabilizer comprising a Bronsted acid, a Lewis acid, an acid or an ester thereof containing a sulfur atom, or a combination comprising at least one of the foregoing.

Embodiment 18

The thermoplastic composition of Embodiment 17, wherein the acid stabilizer comprises phosphoric acid; phosphorus acid; hypophosphorous acid; pyrophosphoric acid; polyphosphoric acid; an organo sulfonic stabilizer of the formula (8) wherein each $R^7$ is independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its ester, and $R^8$ is hydrogen; or $R^8$ is $C_{1-30}$ alkyl; or $R^8$ is a group of the formula —S(=O)$_2$—$R^7$; or a combination comprising at least one of the foregoing, preferably wherein the acid stabilizer comprises phosphoric acid, phosphorus acid, butyl tosylate, p-toluene sulfonic acid, or a combination thereof.

Embodiment 19

The thermoplastic composition of any one or more of Embodiments 1 to 18, comprising, based on the total weight of the thermoplastic composition: 60 to 70 wt % of a copolycarbonate comprising bisphenol A carbonate units and second carbonate units of the formula (1a) wherein $R^5$ is hydrogen, phenyl or methyl, preferably phenyl; 25 to 40 wt % of a bisphenol A homopolycarbonate; and optionally 6 to 12 ppm of butyl tosylate; wherein the second carbonate units are present in an amount of 18 to 35 mol % based on the sum of the moles of the copolycarbonate and the bisphenol A homopolycarbonate, the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, and the thermoplastic composition has a bisphenol A purity of at least 99.7% as determined by high performance liquid chromatography; and wherein the thermoplastic composition has: an increase in yellowness index of less than 10 during 1000 hours of heat aging at 155° C., as measured by ASTM D1925 on a 1 mm thick molded plaque.

Embodiment 20

The thermoplastic composition of any one or more of Embodiments 1 to 18, comprising, based on the total weight of the thermoplastic composition: 96 to 99.9 wt % of a copolycarbonate comprising bisphenol A carbonate units and second carbonate units of the formula (1a) wherein $R^5$ is hydrogen, phenyl or methyl, preferably phenyl; and optionally 6 to 12 ppm of butyl tosylate; wherein the second carbonate units are present in an amount of 10 to 49 mol %, preferably 13 to 40 mol % or 35 to 49 mol %, more preferably 18 to 35 mol % based on the sum of the moles of the copolycarbonate and the bisphenol A homopolycarbonate, the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, and the thermoplastic composition has a bisphenol A purity of at least 99.6%, or at least 99.7% as determined by high performance liquid chromatography; and wherein the thermoplastic composition has: a Vicat B120 of 180° C. or higher as measured according to ISO 306; and an increase in yellowness index of less than 10 or less than 10 during 1000 hours of heat aging at 155° C., as measured by ASTM D1925 on a 1 mm thick molded plaque.

Embodiment 21

The thermoplastic composition of any one or more of Embodiments 1 to 20, wherein the thermoplastic composition has a yellowness index of less than 10 measured according to ASTM D1925 on a plaque of 2.5 mm thickness molded at a temperature of 355° C. for a residence time of 10 minutes.

Embodiment 22

The thermoplastic composition of any one or more of Embodiments 1 to 21, further comprising a processing aid, a heat stabilizer, a colorant, a flame retardant, an impact modifier, an epoxy-containing polymer, or a combination thereof.

Embodiment 24

The thermoplastic composition of any one or more of Embodiments 1 to 22, wherein the thermoplastic composition has one or more of the following properties: a heat deflection temperature of 150 or higher as measured on a 80×10×4 mm bar with a 64 mm span at 0.45 MPa according to ISO 75/Bf; a haze of less than 1.5, or less than 1.0 and a total transmission greater than 86% or greater than 88%, each measured according to ASTM D1003-00 using the color space CIE1931 (Illuminant C and a 2° observer) on a molded plaque with a 1.0 mm thickness; a haze of less than 1.5, or less than 1.0 and a total transmission greater than 84% or greater than 86%, each measured according to ASTM D1003-00 using the color space CIE1931 (Illuminant C and a 2° observer) on a molded plaque with a 3.0 mm thickness; a transmission at wavelength of 400 nm of greater than 75%, or greater than 80% or greater than 85% measured with Perkin Elmer 950 spectrometer equipped with 15 cm integrated sphere on a molded plaque with a thickness of 1 mm; a transmission at wavelength of 550 nm of greater than 85%, or greater than 87% or greater than 88% measured with Perkin Elmer 950 spectrometer equipped with 15 cm integrated sphere on a molded plaque with a thickness of 1 mm; a transmission at wavelength of 940 nm of greater than 88%, or greater than 89% or greater than 90% measured with Perkin Elmer 950 spectrometer equipped with 15 cm integrated sphere on a molded plaque with a thickness of 1 mm; a refractive index of greater than 1.59 or greater than 1.60 at 587.6 nm or a refractive index of greater than 1.57 or greater than 1.58 at 940 nm measured according to IS 489 on a molded plaque with a thickness of 1 mm; an Abbe number of less than 32 or less than 30 measured according to ISO 489 on a molded plaque with a thickness of 1 mm; a melt volume flow rate (MVR) greater than 10 cc/min, measured at 330° C./2.16 Kg at 360 second dwell according to ISO 1133; an Izod notched impact energy of at least 6 kJ/m$^2$, or of at least 8 kJ/m$^2$, as measured at 23° C. according to ISO 180/1A using a multipurpose test specimen in accordance with ISO 3167 TYPE A; an Izod notched impact energy of at least 70 J/m, or of at least 88 J/m, as measured at 23° C. according to ASTM D256; an increase in yellowness index of less than 4, or of less than 3 during 1500 hours of heat aging at 140° C., as measured by ASTM D1925 on a 1.0 mm thick molded plaque; an increase in yellowness index of less than 0.5, or of less than 0.3 after 100 hours of hydro ageing at 121° C. in an autoclave, as measured by ASTM D1925 on a 2.5 mm thick molded plaque; a UL94-V0 rating at a thickness of 2.5 mm or higher; or a UL94-V2 rating at a thickness of 0.8 mm to 1.5 mm.

Embodiment 24

An article, wherein the article a molded article, a thermoformed article, an extruded film, an extruded sheet, one or more layers of a multi-layer article, a substrate for a coated article, or a substrate for a metallized article made from the copolymer or composition of any one or more of Embodiments 1 to 23.

Embodiment 25

The article of Embodiment 24, wherein the article has no significant part distortion or discoloration when the article is subjected to a secondary operation comprising over-molding, lead-free soldering, wave soldering, low temperature soldering, or coating, or a combination thereof.

Embodiment 26

The article of Embodiment 24 or Embodiment 25, wherein one or more surfaces of the article are partially or completely coated with a hard coat, a UV protective coat, an anti-refractive coat, an anti-reflective coat, a scratch resistant coat, or a combination comprising at least one of the foregoing or metallized.

Embodiment 27

The article of any one or more of Embodiments 24 to 26, wherein the article is a lens, a light guide, a waveguide, a collimator, an optical fiber, a window, a door, a visor, a display screen, an electronic device, a scientific or medical device, a safety shield, a fire shield, an autoclavable article, wire or cable sheathing, a mold, a dish, a tray, a screen, an enclosure, glazing, packaging, a gas barrier, an anti-fog layer, or an anti-reflective layer.

Embodiment 28

The article of any one or more of Embodiments 24 to 27, wherein the article is a component of a device comprising a lens, a device comprising a light guide, a device comprising a waveguide, a device comprising a collimator, a device comprising an optical fiber, a device comprising a lighting element, a device comprising a window, a device comprising a door, or the article is a structural component of a vehicle, a building, or an appliance, or the article is a component of a medical device, a component of a display screen, a component of an electronic device, a component of a safety device, a component of a screen, a component of conveyor, a component of a mold, a component of a dish, a component of an enclosure, a component of packaging, a component of a gas barrier, a component of an encapsulant, a component of a label, a component of a gas barrier, a component of an anti-fog assembly, or a component of an anti-reflective assembly.

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs. As used herein, a "combination" is inclusive of blends, mixtures, alloys, reaction products, and the like. A "combination thereof" includes any combination comprising at least one of the listed components or properties optionally together with a like component or property not listed.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms; "cycloalkylene" refers to a divalent radical formed by the removal of two hydrogen atoms from two different carbon atoms on one or more rings of a cycloalkyl group; "aryl" refers to an aromatic monovalent group containing only carbon in the aromatic ring or rings; "arylene" refers to an aromatic divalent group containing only carbon in the aromatic ring or rings; "alkylarylene" refers to an aryl group that has been substituted with an alkyl group as defined above, with 4-methylphenyl being an exemplary alkylarylene group; "arylalkylene" refers to an alkyl group that has been substituted with an aryl group as defined above, with benzyl being an exemplary arylalkylene group.

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Groups that can be present on a substituted position include (—NO$_2$), cyano (—CN), halogen, thiocyano (—SCN), $C_{2-6}$ alkanoyl (e.g., acyl ($H_3CC$(=O)—); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; $C_{6-12}$ aryl having at least one aromatic rings (e.g., phenyl, biphenyl, naphthyl, or the like, each ring either substituted or unsubstituted aromatic); $C_{7-19}$ arylalkylene having 1 to 3 separate or fused rings and from 6 to 18 ring carbon atoms; or arylalkoxy having 1 1 to 3 separate or fused rings and from 6 to 18 ring carbon atoms. The stated number of carbon atoms includes any substituents.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising:
   a copolycarbonate comprising 60 to 85 mol % of bisphenol A carbonate units and 15 to 40 mol % of second carbonate units each based on the total number of carbonate units in the copolycarbonate, the second carbonate units having the formula

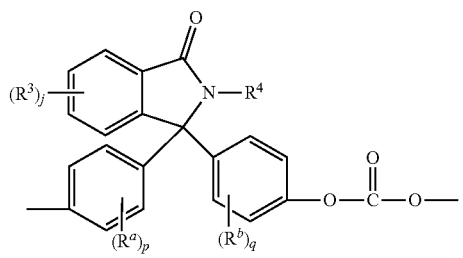

wherein
   $R^a$ and $R^b$ are each independently a $C_{1-12}$ alkyl, $C_{2-12}$ alkenyl, $C_{3-8}$ cycloalkyl, or $C_{1-12}$ alkoxy,
   each $R^3$ is independently a $C_{1-6}$ alkyl,
   $R^4$ is hydrogen, $C_{2-6}$ alkyl or phenyl optionally substituted with 1 to 5 $C_{1-6}$ alkyl groups,
   p, q, and j are each independently 0 to 4; and
   10 to 60 wt % of a bisphenol A homopolycarbonate based on the total weight of the thermoplastic composition;
wherein
   the second carbonate units are present in an amount of 10 to 49 mol % based on the sum of the moles of the copolycarbonate and the bisphenol A homopolycarbonate,
   the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, and
   the thermoplastic composition has a bisphenol A purity of at least 99.6%, as determined by high performance liquid chromatography; and
wherein the thermoplastic composition has:
   a Vicat B 120 softening temperature of 155° C. or higher as measured according to ISO 306; and
   an increase in yellowness index of less than 10 during 1000 hours of heat aging at 155° C., as measured by ASTM D1925 on a 1 mm thick molded plaque.

2. A thermoplastic composition comprising:
   a copolycarbonate comprising 60 to 85 mol % of bisphenol A carbonate units and 15 to 40 mol % of second carbonate units each based on the total number of carbonate units in the copolycarbonate, the second carbonate units having the formula

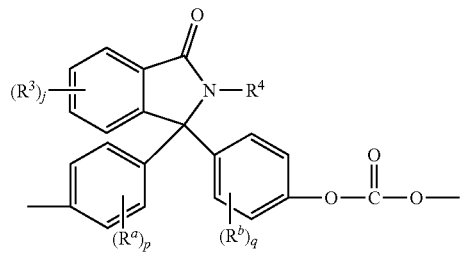

wherein
   $R^a$ and $R^b$ are each independently a $C_{1-12}$ alkyl, $C_{2-12}$ alkenyl, $C_{3-8}$ cycloalkyl, or $C_{1-12}$ alkoxy,
   each $R^3$ is independently a $C_{1-6}$ alkyl,
   $R^4$ is hydrogen, $C_{2-6}$ alkyl or phenyl optionally substituted with 1 to 5 $C_{1-6}$ alkyl groups,
   p, q, and j are each independently 0 to 4; and
   10 to 60 wt % of a bisphenol A homopolycarbonate based on the total weight of the thermoplastic composition;
wherein
   the second carbonate units are present in an amount of 10 to 49 mol %, based on the sum of the moles of the copolycarbonate and the bisphenol A homopolycarbonate,
   the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, and
   the thermoplastic composition has a bisphenol A purity of at least 99.6% as determined by high performance liquid chromatography; and
wherein
   the thermoplastic composition has:
   a Vicat B120 of 155° C. or higher as measured according to ISO 306; and
   a yellowness index which is at least 20% lower compared to the same composition having a Bisphenol A purity below 99.6%, as measured by ASTM D1925 on a 2.5 mm thick molded plaque with a melt temperature of 355° C. and a residence time of 10 min.

3. The thermoplastic composition of claim 2 having an increase in yellowness index of less than 15 during 1000 hours of heat aging at 155° C., as measured by ASTM D1925 on a 1 mm thick molded plaque.

4. The thermoplastic composition of claim 1, wherein
the second carbonate repeating units in the copolycarbonate are of the formula

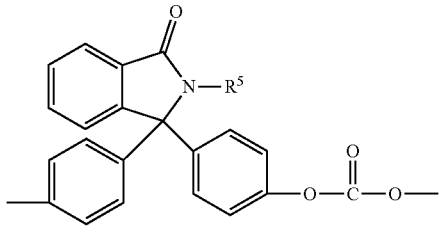

wherein $R^5$ is hydrogen, phenyl or methyl.

5. The thermoplastic composition of claim 1, wherein the copolycarbonate has less than 15 mol % of the second carbonate units directly coupled to another second carbonate unit, based on the total number of carbonate units in the copolycarbonate.

6. The thermoplastic composition of claim 1,
wherein the copolycarbonate further comprises at least 5 mol % of third carbonate units different from the bisphenol A carbonate units and the second carbonate unit, based on the total number of carbonate units in the copolycarbonate, the third carbonate units comprising carbonate units of the formula:

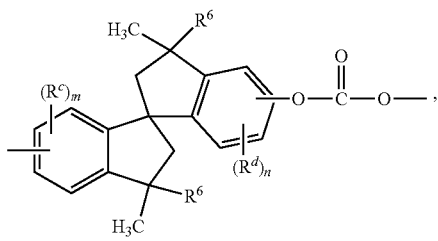

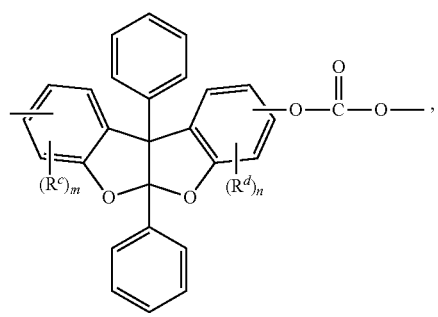

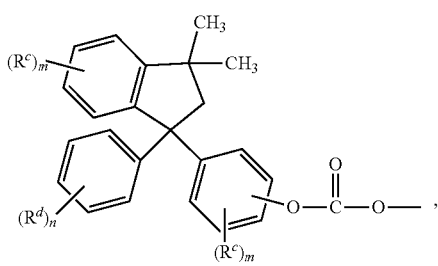

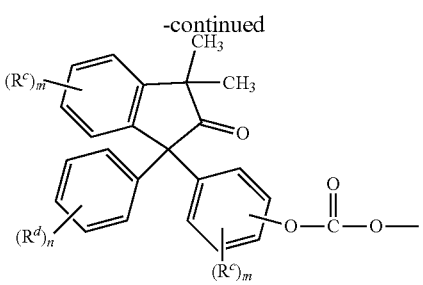

or a combination thereof, wherein
$R^c$ and $R^d$ are each independently a $C_{1-12}$ alkyl, $C_{2-12}$ alkenyl, $C_{3-8}$ cycloalkyl, or $C_{1-12}$ alkoxy,
each $R^6$ is independently $C_{1-3}$ alkyl or phenyl,
$X^a$ is a $C_{6-12}$ polycyclic aryl, $C_{3-18}$ mono- or polycycloalkylene, $C_{3-18}$ mono- or polycycloalkylidene, $-(Q^1)_x-G-(Q^2)_y-$ group wherein $Q^1$ and $Q^2$ are each independently a $C_{1-3}$ alkylene, G is a $C_{3-10}$ cycloalkylene, x is 0 or 1, and y is 1, or $-C(P^1)(P^2)-$ wherein $P^1$ is $C_{1-12}$ alkyl and $P^2$ is $C_{6-12}$ aryl, and
m and n are each independently 0 to 4, or a combination thereof.

7. The thermoplastic composition of claim 6, wherein the third carbonate units have the formula

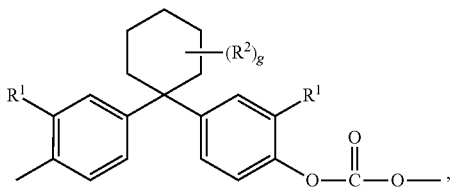

wherein
each $R^1$ is independently hydrogen or methyl,
each $R^2$ is independently methyl or hydrogen, and
g is 0 to 2.

8. The thermoplastic composition of claim 6, wherein the copolycarbonate comprises from 15 to 70 mol % of the bisphenol A carbonate units, 5 to 50 mol % of the second carbonate units, and 5 to 50 mol % of the third carbonate units, each based on the total number of carbonate units in the copolycarbonate.

9. The thermoplastic composition of claim 1, wherein the copolycarbonate has a hydroxyl end group content of less than 200 ppm and the optional bisphenol A homopolycarbonate has a hydroxyl end group content of less than 150 ppm.

10. The thermoplastic composition of claim 1, wherein the copolycarbonate, the bisphenol A homopolycarbonate, or both are derived from a bisphenol A having a sulfur content of less than 2 ppm, each as measured by a Total Sulfur Analysis based on combustion and coulometric detection.

11. A thermoplastic composition comprising: 90 to 99.8 wt % of a copolycarbonate based on the total weight of the thermoplastic composition, the copolycarbonate comprising 60 to 85 mol % of bisphenol A carbonate units and 15 to 40 mol % of second carbonate units each based on the total number of carbonate units in the copolycarbonate, the second carbonate units having the formula

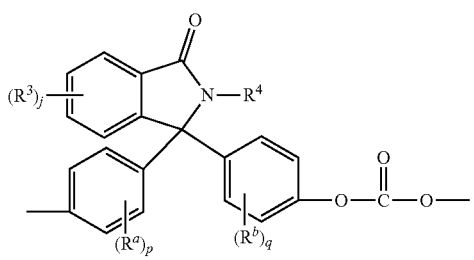

wherein
$R^a$ and $R^b$ are each independently a $C_{1-12}$ alkyl, $C_{2-12}$ alkenyl, $C_{3-8}$ cycloalkyl, or $C_{1-12}$ alkoxy,
each $R^3$ is independently a $C_{1-6}$ alkyl,
$R^4$ is hydrogen, $C_{2-6}$ alkyl or phenyl optionally substituted with 1 to 5 $C_{1-6}$ alkyl groups,
p, q, and j are each independently 0 to 4; and
optionally a bisphenol A homopolycarbonate based on the total weight of the thermoplastic composition;
wherein
the second carbonate units are present in an amount of 10 to 49 mol % based on the sum of the moles of the copolycarbonate and the bisphenol A homopolycarbonate,
the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, and
the thermoplastic composition has a bisphenol A purity of at least 99.6%, as determined by high performance liquid chromatography; and
wherein the thermoplastic composition has:
a Vicat B120 softening temperature of 155° C. or higher as measured according to ISO 306; and
an increase in yellowness index of less than 10 during 1000 hours of heat aging at 155° C., as measured by ASTM D1925 on a 1 mm thick molded plaque.

12. The thermoplastic composition of claim 1, wherein the copolycarbonate is present in an amount of is 45 to 75 wt %, and the bisphenol A homopolycarbonate is present in an amount of 25 to 55 wt %, each based on the total weight of the thermoplastic composition.

13. The thermoplastic composition of claim 1, further comprising 1 ppm to 40 ppm of an acid stabilizer, the acid stabilizer comprising a Bronsted acid, a Lewis acid, an acid or an ester thereof containing a sulfur atom, or a combination comprising at least one of the foregoing.

14. The thermoplastic composition of claim 13, wherein the acid stabilizer comprises phosphoric acid; phosphorus acid; hypophosphorous acid; pyrophosphoric acid; polyphosphoric acid; an organo sulfonic stabilizer of the formula

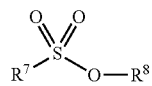

wherein each $R^7$ is independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its ester, and $R^8$ is hydrogen; or $R^8$ is $C_{1-30}$ alkyl; or $R^8$ is a group of the formula $-S(=O)_2-R^7$; or a combination comprising at least one of the foregoing.

15. The thermoplastic composition of claim 1, comprising, based on the total weight of the thermoplastic composition:
60 to 70 wt % of a copolycarbonate comprising bisphenol A carbonate units and second carbonate units of the formula

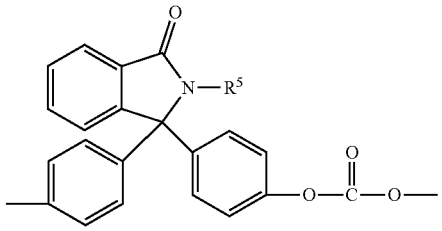

wherein $R^5$ is hydrogen, phenyl or methyl;
25 to 40 wt % of a bisphenol A homopolycarbonate; and
optionally 6 to 12 ppm of butyl tosylate;
wherein
the second carbonate units are present in an amount of 18 to 35 mol % based on the sum of the moles of the copolycarbonate and the bisphenol A homopolycarbonate,
the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, and
the thermoplastic composition has a bisphenol A purity of at least 99.7% as determined by high performance liquid chromatography; and
wherein the thermoplastic composition has:
an increase in yellowness index of less than 10 during 1000 hours of heat aging at 155° C., as measured by ASTM D1925 on a 1 mm thick molded plaque.

16. The thermoplastic composition of claim 11, comprising, based on the total weight of the thermoplastic composition:
96 to 99.8 wt % of the copolycarbonate, the copolycarbonate comprising bisphenol A carbonate units and second carbonate units of the formula

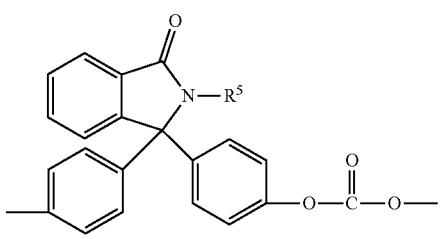

wherein $R^5$ is hydrogen, phenyl or methyl; and
optionally 6 to 12 ppm of butyl tosylate;
wherein
the second carbonate units are present in an amount of 10 to 49 mol %, based on the sum of the moles of the copolycarbonate and the bisphenol A homopolycarbonate, the copolycarbonate comprises less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography, and the thermoplastic composition has a bisphenol A purity of at least 99.6% as determined by high performance liquid chromatography; and wherein the thermoplastic composition has:

a Vicat B120 of 180° C. or higher as measured according to ISO 306; and an increase in yellowness index of less than 10 during 1000 hours of heat aging at 155° C., as measured by ASTM D1925 on a 1 mm thick molded plaque.

17. The thermoplastic composition of claim 1, wherein the thermoplastic composition has a yellowness index of less than 10 measured according to ASTM D1925 on a plaque of 2.5 mm thickness molded at a temperature of 355° C. for a residence time of 10 minutes.

18. The thermoplastic composition of claim 1, further comprising a processing aid, a heat stabilizer, a colorant, a flame retardant, an impact modifier, an epoxy-containing polymer, or a combination thereof.

19. An article, wherein the article a molded article, a thermoformed article, an extruded film, an extruded sheet, one or more layers of a multi-layer article, a substrate for a coated article, or a substrate for a metallized article made from the composition of claim 1.

20. The composition of claim 1, wherein the composition is free of epoxy additives.

* * * * *